(12) United States Patent
Tomimoto et al.

(10) Patent No.: US 11,381,735 B2
(45) Date of Patent: Jul. 5, 2022

(54) ELECTRONIC DEVICE

(71) Applicant: CANON KABUSHIKI KAISHA, Tokyo (JP)

(72) Inventors: Honkai Tomimoto, Tokyo (JP); Gen Kitamura, Kanagawa (JP); Hirotsugu Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/190,237

(22) Filed: Mar. 2, 2021

(65) Prior Publication Data

US 2021/0281740 A1 Sep. 9, 2021

(30) Foreign Application Priority Data

Mar. 5, 2020 (JP) ............................. JP2020-037682

(51) Int. Cl.
*H04N 5/232* (2006.01)

(52) U.S. Cl.
CPC ..... *H04N 5/23216* (2013.01); *H04N 5/23222* (2013.01); *H04N 5/23245* (2013.01)

(58) Field of Classification Search
CPC ........... H04N 5/23216; H04N 5/23245; H04N 5/23222; H04N 5/23299; H04N 5/247
USPC ...................................................... 348/220.1
See application file for complete search history.

(56) References Cited

U.S. PATENT DOCUMENTS

| | | | | |
|---|---|---|---|---|
| 9,491,336 B2* | 11/2016 | Hsiang | ................. | H04N 5/2251 |
| 9,554,041 B1* | 1/2017 | Shin | ....................... | H04N 5/247 |
| 9,992,414 B2* | 6/2018 | Masuda | ............. | H04N 5/23238 |
| 10,165,165 B2* | 12/2018 | Seo | ........................ | H04N 5/2254 |
| 10,721,401 B2* | 7/2020 | Kajiwara | ........... | H04N 5/23229 |
| 10,728,449 B2* | 7/2020 | Yang | .................... | H04N 5/2251 |
| 11,218,632 B2* | 1/2022 | Gopalakrishna | ....... | H04N 5/238 |
| 2009/0325493 A1* | 12/2009 | Suzuki | ................... | H04N 5/772 |
| | | | | 455/41.3 |
| 2015/0365596 A1* | 12/2015 | Hsiang | ................. | H04N 5/2252 |
| | | | | 348/333.13 |
| 2017/0163889 A1* | 6/2017 | Evans, V | ............. | H04N 5/2259 |
| 2019/0149729 A1* | 5/2019 | Yang | .................... | H04N 5/2251 |
| | | | | 348/36 |
| 2019/0306419 A1* | 10/2019 | Kajiwara | ............. | H04N 13/117 |
| 2021/0136284 A1* | 5/2021 | Gopalakrishna | ....... | H04N 5/238 |

(Continued)

FOREIGN PATENT DOCUMENTS

JP 2003244514 A 8/2003

*Primary Examiner* — Pritham D Prabhakher
(74) *Attorney, Agent, or Firm* — Rossi, Kimms & McDowell LLP

(57) ABSTRACT

An electronic device according to the present invention, includes: at least one image sensor configured to be able of capturing an image of a first capturing range and an image of a second capturing range different from the first capturing range; and at least one memory and at least one processor which function as: a control unit configured to control to in response to an operation on a first position on a side, which is oriented in a first direction, of the electronic device, capture an image of the first capturing range by the at least one image sensor, and in response to an operation on a second position on a side, which is oriented in a second direction different from the first direction, of the electronic device, capture an image of the second capturing range by the at least one image sensor.

18 Claims, 19 Drawing Sheets

(56) References Cited

U.S. PATENT DOCUMENTS

| | | | |
|---|---|---|---|
| 2021/0176397 A1* | 6/2021 | Müller | H04N 5/2259 |
| 2021/0195106 A1* | 6/2021 | VanBlon | H04N 5/232 |
| 2021/0243368 A1* | 8/2021 | Park | G06T 5/50 |

* cited by examiner

ELECTRONIC DEVICE

BACKGROUND OF THE INVENTION

Field of the Invention

The present invention relates to an electronic device capable of capturing images of a plurality of capturing ranges.

Description of the Related Art

Japanese Patent Application Publication No. 2003-244514 discloses a technique for changing the capturing range of a digital camera in response to a touch operation on a touch panel (touch-panel liquid crystal monitor) that can be attached to and detached from the digital camera.

However, with the technique of Japanese Patent Application Publication No. 2003-244514, a user, such as a photographer, may fail to intuitively (easily) perform an operation of changing a capturing range to a range in an intended direction (direction desired for image capturing).

When the orientation of the digital camera (the side where the object is present) is the same as the orientation of the touch panel (the opposite side to the operation surface), the user can intuitively perform an operation (operation of changing a capturing range). For example, when the user wants to capture an image on the right of the user, the user touches the right side of the touch panel to change (move) the capturing range to the right of the user. In this way, the user can intuitively perform the operation since the side to be touched is the same as the side to which the capturing range is changed.

In contrast, when the orientation of the digital camera is opposite to the orientation of the touch panel, the user cannot intuitively perform an operation. In this case, the touch operation on the right side of the touch panel causes the capturing range to be changed to the left, instead of the right, of the user. When the user wants to capture an image on the right of the user, the user needs to touch the left side of the touch panel. In this way, the user cannot intuitively perform the operation since the side to be touched is opposite to the side to which the capturing range is changed.

SUMMARY OF THE INVENTION

The present invention provides an electronic device that allows a user to intuitively (easily) perform an operation of changing a capturing range to a range in an intended direction (desired direction for image capturing).

An electronic device according to the present invention, includes: at least one image sensor configured to be able of capturing an image of a first capturing range and an image of a second capturing range different from the first capturing range; and at least one memory and at least one processor which function as: a control unit configured to control to in response to an operation on a first position on a side, which is oriented in a first direction, of the electronic device, capture an image of the first capturing range by the at least one image sensor, and in response to an operation on a second position on a side, which is oriented in a second direction different from the first direction, of the electronic device, capture an image of the second capturing range by the at least one image sensor.

Further features of the present invention will become apparent from the following description of exemplary embodiments with reference to the attached drawings.

DESCRIPTION OF THE EMBODIMENTS

First Embodiment

Figure 1A:
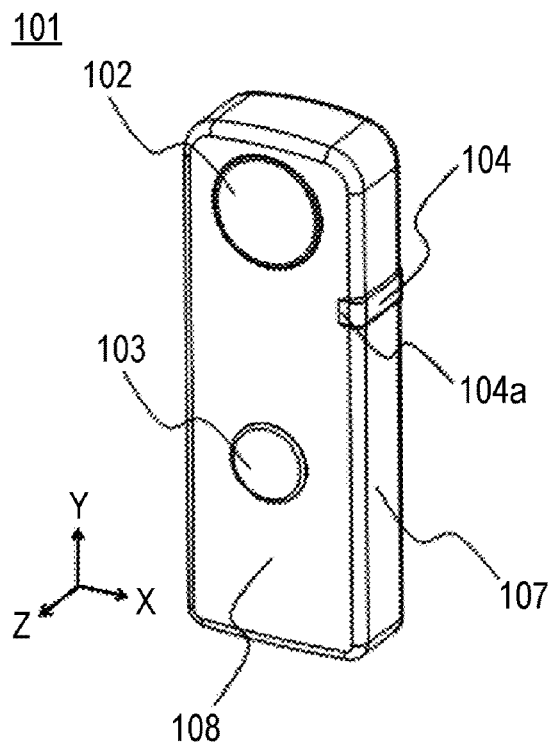
FIGS. 1A and 1B are external views of a digital camera of first and second embodiments.
Figure 1B:
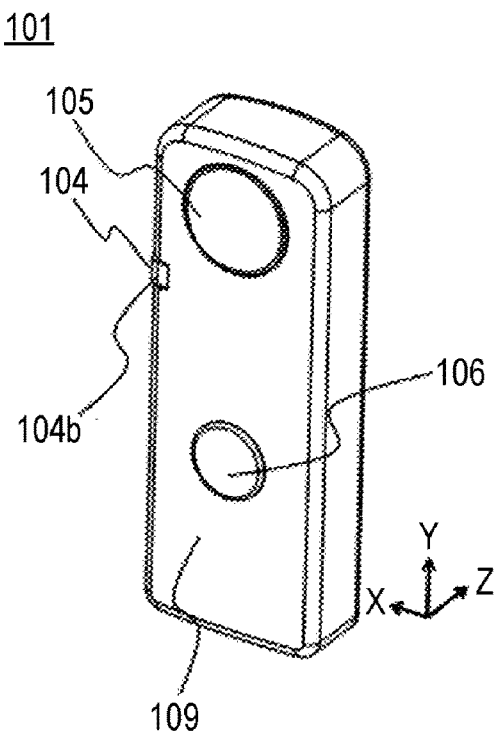

A first embodiment of the present invention is described in detail below with reference to the accompanying drawings. FIGS. 1A and 1B show the appearance of a digital camera 101 as an example of an electronic device to which the present invention is applicable. FIG. 1A is a front perspective view of the digital camera 101, and FIG. 1B is a back perspective view of the digital camera 101. In FIGS. 1A and 1B, the X-axis represents the width direction (lateral direction) of the digital camera 101, the Y-axis represents the height direction (vertical direction) of the digital camera 101, and the Z-axis represents the optical-axis direction (depth direction) of the digital camera 101.

The digital camera 101 has a front surface 108, which includes a first camera unit 102 and a first capturing button 103, and a back surface 109, which includes a second camera unit 105 and a second capturing button 106. The first camera unit 102 is an imaging unit for capturing an image of a capturing range on the side corresponding to the front surface 108 of the digital camera 101 (first capturing range).

The first capturing button 103 is an operation member for instructing capturing of an image with the first camera unit 102. In response to an operation (pressing) on the first capturing button 103, the digital camera 101 captures an image (still image or moving image) with the first camera unit 102. Similarly, the second camera unit 105 is an imaging unit for capturing an image of a capturing range on the side corresponding to the back surface 109 of the digital camera 101 (second capturing range). The second capturing button 106 is an operation member for instructing capturing of an image with the second camera unit 105. In response to an operation (pressing) on the second capturing button 106, the digital camera 101 captures an image (still image or moving image) with the second camera unit 105. When performing moving-image capturing or interval capturing (capturing in which still images are repeatedly captured at predetermined time intervals), the digital camera 101 starts capturing or ends the capturing in response to a pressing on the first capturing button 103 or the second capturing button 106.

As described above, in the present embodiment, the first camera unit 102 and the first capturing button 103 are on the same surface (front surface 108), and the second camera unit 105 and the second capturing button 106 are on the same surface (back surface 109). In other words, the first capturing button 103 for instructing capturing with the first camera unit 102 is at a position that is visible and operable from the side corresponding to the first capturing range (the capturing range of the first camera unit 102). The second capturing button 106 for instructing capturing with the second camera unit 105 is at a position that is visible and operable from the side corresponding to the second capturing range (the capturing range of the second camera unit 105). This allows for intuitive operation for taking selfies, for example.

The first and second capturing buttons 103 and 106 do not have to be arranged as described above. For example, the first camera unit 102 and the second capturing button 106 may be on the same surface (front surface 108), and the second camera unit 105 and the first capturing button 103 may be on the same surface (back surface 109). In other words, the first capturing button 103 may be arranged at a position that is visible and operable from the side opposite to the first capturing range, that is, from the side corresponding to the second capturing range. Likewise, the second capturing button 106 may be arranged at a position that is visible and operable from the side opposite to the second capturing range, that is, from the side corresponding to the first capturing range. This allows the user (photographer) to intuitively perform operation such as capturing of an image of a range in which the user (photographer) is absent (a range that is opposite to and seen by the user).

A capturing-direction notification unit 104 notifies the user or others of the capturing status of the digital camera 101. The present embodiment uses LEDs (light sources) for this notification, but the notification method is not limited to this. The capturing-direction notification unit 104 is arranged on a side surface 107 of the digital camera 101 and extends from the front surface 108 to the back surface 109 of the digital camera 101.

The capturing-direction notification unit 104 includes a first LED 104a located at the front surface 108 and a second LED 104b located at the back surface 109. The first LED 104a is visible from the side corresponding to the front surface 108 (the side corresponding to the first capturing range (the capturing range of the first camera unit 102)), while the second LED 104b is visible from the side corresponding to the back surface 109 (the side corresponding to the second capturing range (the capturing range of the second camera unit 105)). For example, the digital camera 101 turns on the first LED 104a while an image of the first capturing range is being captured with the first camera unit 102, and turns on the second LED 104b while an image of the second capturing range is being captured with the second camera unit 105. This allows the object to easily determine whether an image of the object is being captured.

Alternatively, the digital camera 101 may turn on the second LED 104b while an image of the first capturing range is being captured with the first camera unit 102, and turn on the first LED 104a while an image of the second capturing range is being captured with the second camera unit 105. This allows a person on the side opposite to the object to easily determine whether an image of the side opposite to that person is being captured.

Furthermore, when the lighting of the first LED 104a and the lighting of the second LED 104b can be visually distinguished by color or brightness, for example, the lighting of the first LED 104a and the lighting of the second LED 104b may be both visible from the side corresponding to the front surface 108 and the side corresponding to the back surface 109.

The arrangement and shape of the capturing-direction notification unit 104 are not limited to those shown in FIGS. 1A and 1B. For example, the first and second LEDs 104a and 104b may be arranged on the side surface 107 in parallel to the Y-axis.

Figure 2:
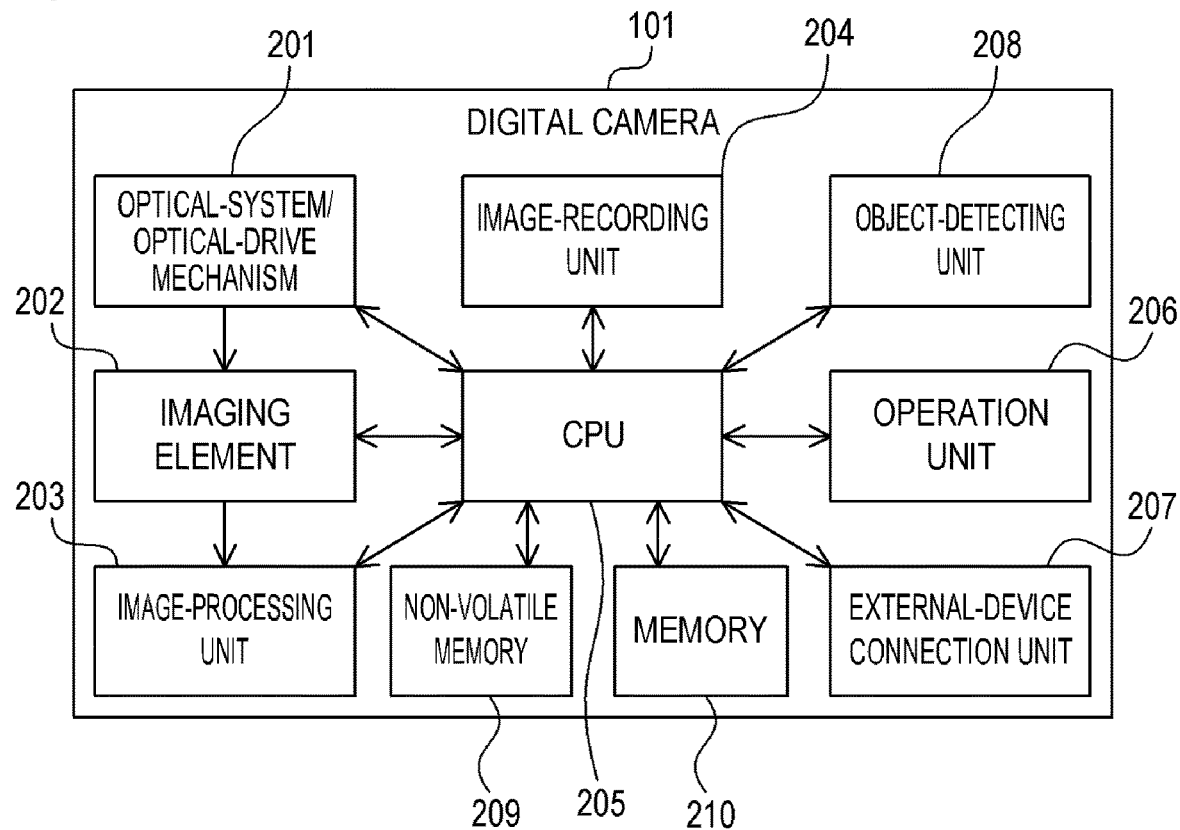
FIG. 2 is a block diagram of the digital camera of the first and second embodiments.

FIG. 2 is a block diagram showing an example of the configuration of the digital camera 101.

The first camera unit 102 includes an optical-system/optical-drive mechanism 201 and an imaging element 202. The optical-system/optical-drive mechanism 201 forms an optical image of an object on the imaging element 202, and moves its optical system (such as a lens) for zooming, for example. The imaging element 202, which may be a CCD or CMOS element, is an imaging element (imaging sensor) that converts an optical image formed by the optical-system/optical-drive mechanism 201 into an electric signal (image data). Although FIG. 2 shows only one set of the optical-system/optical-drive mechanism 201 and the imaging element 202, the second camera unit 105 also has an optical-system/optical-drive mechanism 201 and an imaging element 202.

An image-processing unit 203 performs various types of image processing such as the compression of image data obtained by the imaging element 202. An image-recording unit 204 stores the image data (captured images) that is output from the image-processing unit 203.

A CPU 205 is a control unit that controls the entire digital camera 101. A non-volatile memory 209 is a memory that is electrically erasable and recordable, such as an EEPROM. The non-volatile memory 209 records (stores) constants, programs, and other data for the operation of the CPU 205. These programs are used to perform processes of various flowcharts, which will be described below. The CPU 205 performs various processes described below by executing programs stored in the non-volatile memory 209. A memory 210 may be a RAM, and the CPU 205 uses the memory 210 as work memory and loads data such as the constants and variables for the operation of the CPU 205 and a program read from the non-volatile memory 209 in the memory 210.

An operation unit 206 receives an operation (instruction) by a user and outputs a signal corresponding to the performed operation to the CPU 205. The operation unit 206 includes the first capturing button 103 and the second capturing button 106. An external-device connection unit 207 connects the digital camera 101 to an external device (external electronic device) wirelessly or by wire, and enables communication (transmission and reception of various data pieces) between the digital camera 101 and the external device. An object-detecting unit 208 detects a specific object (e.g., position and size) from the captured image.

Figure 3A:
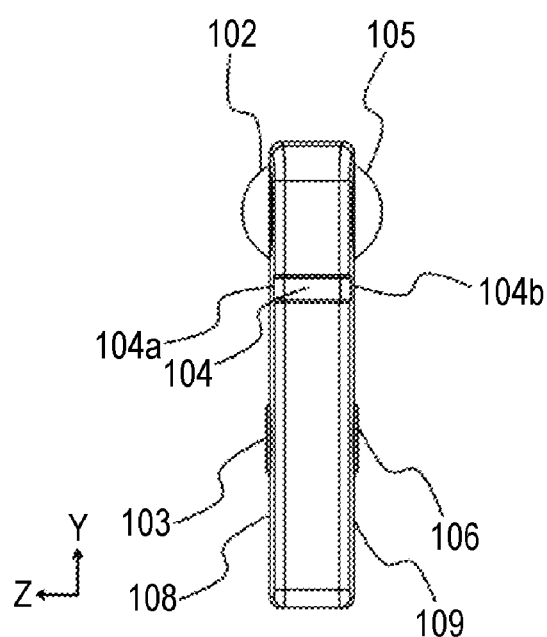
FIGS. 3A to 3D are side views of the digital camera of the first and second embodiments.
Figure 3B:
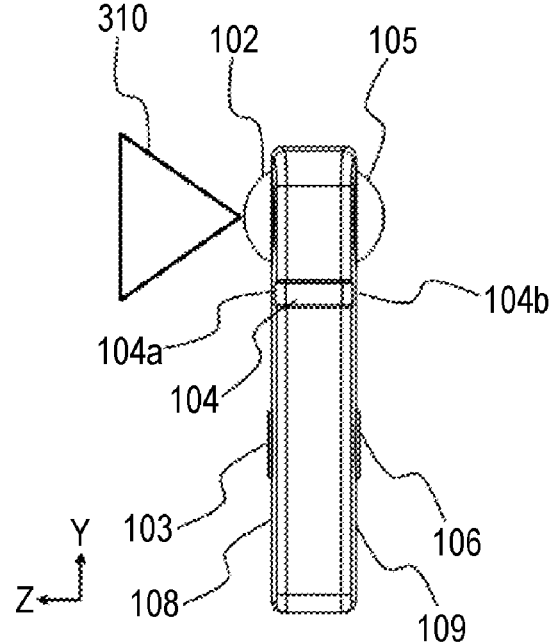
Figure 3C:
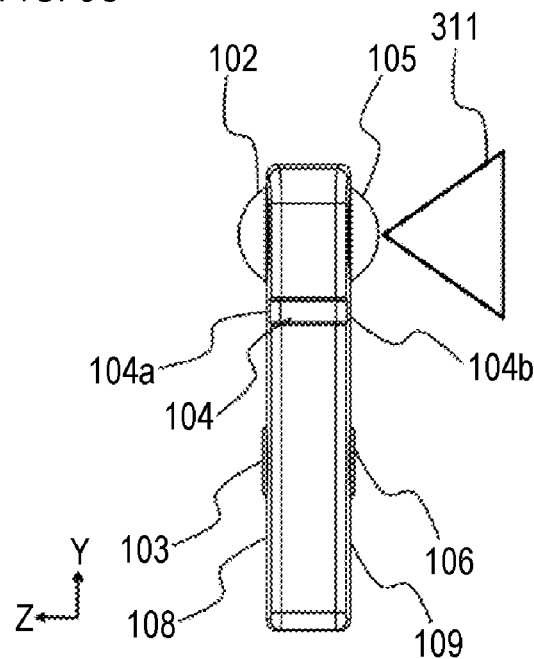
Figure 3D:
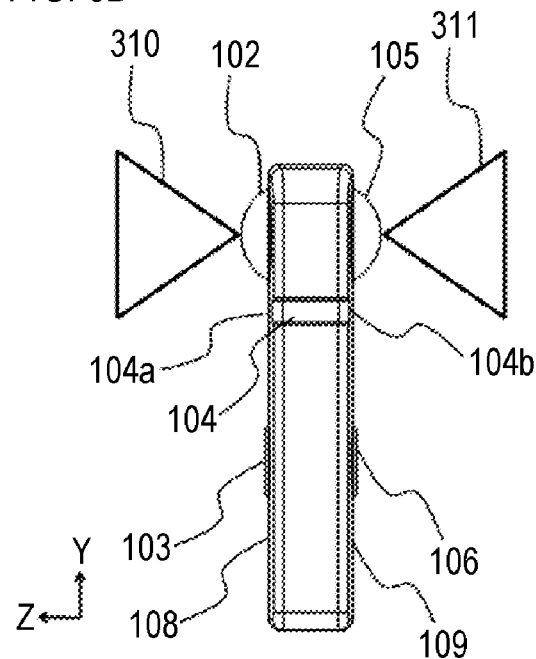

FIGS. 3A to 3D are side views of the digital camera 101 as viewed from the positive side of the X-axis. FIG. 3A shows a state in which neither of the first and second camera units 102 and 105 is capturing an image. FIG. 3B shows a state in which the first camera unit 102 is capturing an image and the second camera unit 105 is not capturing an image. FIG. 3C shows a state in which the first camera unit 102 is not capturing an image and the second camera unit 105 is capturing an image. FIG. 3D shows a state in which both the first and second camera units 102 and 105 are capturing images. The range 310 in FIGS. 3B and 3D represents the first capturing range (the capturing range of the first camera unit 102), and the range 311 in FIGS. 3C and 3D represents the second capturing range (the capturing range of the second camera unit 105).

To perform capturing (e.g., still-image capturing) with the first camera unit 102 or to start capturing (e.g., moving-image capturing or interval capturing) with the first camera unit 102, the user presses the first capturing button 103, which is located on the same side as the first camera unit 102. When the first capturing button 103 is pressed, the CPU 205 performs (starts) capturing with the first camera unit 102 in response to the signal from the first capturing button 103. At this time, the state of the digital camera 101 may change from the state shown in FIG. 3A to the state shown in FIG. 3B. While the capturing with the first camera unit 102 (capturing of an image of the first capturing range 310) is in progress, the CPU 205 turns on the first LED 104a located on the same side as the first camera unit 102 to notify that the capturing is in progress. When the first LED 104a is turned on, a person on the side corresponding to the front surface 108 (the side corresponding to the first capturing range 310) can identify that capturing of the first capturing range 310 is in progress.

To end the capturing (e.g., moving-image capturing or interval capturing) with the first camera unit 102, the user presses the first capturing button 103 while the capturing with the first camera unit 102 is in progress. When the first capturing button 103 is pressed, the CPU 205 ends the capturing with the first camera unit 102 in response to the signal from the first capturing button 103. At this time, the state of the digital camera 101 may change from the state shown in FIG. 3B to the state shown in FIG. 3A. Upon ending the capturing with the first camera unit 102, the CPU 205 turns off the first LED 104a.

To perform capturing (e.g., still-image capturing) with the second camera unit 105 or to start capturing (e.g., moving-image capturing or interval capturing) with the second camera unit 105, the user presses the second capturing button 106, which is located on the same side as the second camera unit 105. When the second capturing button 106 is pressed, the CPU 205 performs (starts) capturing with the second camera unit 105 in response to the signal from the second capturing button 106. At this time, the state of the digital camera 101 may change from the state shown in FIG. 3A to the state shown in FIG. 3C. While the capturing with the second camera unit 105 (capturing of an image of the second capturing range 311) is in progress, the CPU 205 turns on the second LED 104b located on the same side as the second camera unit 105 to notify that the capturing is in progress. When the second LED 104b is turned on, a person on the side corresponding to the back surface 109 (the side corresponding to the second capturing range 311) can identify that capturing of the second capturing range 311 is in progress.

To end the capturing (e.g., moving-image capturing or interval capturing) with the second camera unit 105, the user presses the second capturing button 106 while the capturing with the second camera unit 105 is in progress. When the second capturing button 106 is pressed, the CPU 205 ends the capturing with the second camera unit 105 in response to the signal from the second capturing button 106. At this time, the state of the digital camera 101 may change from the state shown in FIG. 3C to the state shown in FIG. 3A. Upon ending the capturing with the second camera unit 105, the CPU 205 turns off the second LED 104b.

When the user wants to perform (or start) capturing with the first camera unit 102 while capturing with the second camera unit 105 is in progress (FIG. 3C), the user presses the first capturing button 103. When the first capturing button 103 is pressed, the CPU 205 performs (starts) capturing with the first camera unit 102 without ending (maintaining) the capturing with the second camera unit 105. At this time, the state of the digital camera 101 may change from the state shown in FIG. 3C to the state shown in FIG. 3D. To notify that the both first and second capturing ranges 310 and 311 are being captured, the CPU 205 turns on the first LED 104a without turning off the second LED 104b (with the second LED 104b remaining on).

When the first capturing button 103 is pressed while capturing of the first and second capturing ranges 310 and 311 is in progress, the CPU 205 ends the capturing with the first camera unit 102 without ending (maintaining) the capturing with the second camera unit 105. At this time, the state of the digital camera 101 may change from the state shown in FIG. 3D to the state shown in FIG. 3C. Upon ending the capturing with the first camera unit 102 without ending (maintaining) the capturing with the second camera unit 105, the CPU 205 turns off the first LED 104a without turning off the second LED 104b (with the second LED 104b remaining on).

When the user wants to perform (or start) capturing with the second camera unit 105 while capturing with the first camera unit 102 is in progress (FIG. 3B), the user presses the second capturing button 106. When the second capturing button 106 is pressed, the CPU 205 performs (starts) capturing with the second camera unit 105 without ending (maintaining) the capturing with the first camera unit 102. At this time, the state of the digital camera 101 may change from the state shown in FIG. 3B to the state shown in FIG. 3D. To notify that both the first and second capturing ranges 310 and 311 are being captured, the CPU 205 turns on the second LED 104b without turning off the first LED 104a (with the first LED 104a remaining on).

When the second capturing button 106 is pressed while capturing of the first and second capturing ranges 310 and 311 is in progress, the CPU 205 ends the capturing with the second camera unit 105 without ending (maintaining) the capturing with the first camera unit 102. At this time, the state of the digital camera 101 may change from the state shown in FIG. 3D to the state shown in FIG. 3B. Upon ending the capturing with the second camera unit 105 without ending (maintaining) the capturing with the first camera unit 102, the CPU 205 turns off the second LED 104b without turning off the first LED 104a (with the first LED 104a remaining on).

When both the first and second capturing buttons 103 and 106 are pressed, the CPU 205 performs both capturing of the first capturing range 310 and capturing of the second capturing range 311. Here, the CPU 205 may combine the captured image of the first capturing range 310 and the captured image of the second capturing range 311 to generate a single image, and record this single image in the image-recording unit 204. The combined single image has a larger field of view (angle of view) than each of the captured image of the first capturing range 310 and the captured image of the second capturing range 311. For example, the captured image of the first capturing range 310 and the captured image of the second capturing range 311 are virtual reality (VR) images each having 180 degree vertical and horizontal field of view. The combined single image is a VR image having 360 degree vertical and horizontal field of view (full-spherical image or omnidirectional image).

When the first and second capturing buttons 103 and 106 are pressed in succession, the CPU 205 performs capturing of the first capturing range 310 and capturing of the second capturing range 311 in succession. Again, the CPU 205 may combine the captured image of the first capturing range 310 and the captured image of the second capturing range 311 to generate a single image, and record this single image in the image-recording unit 204. For example, the first capturing button 103 and the second capturing button 106 may be pressed in succession with the position of the photographer changed between the side corresponding to the first capturing button 103 and the side corresponding to the second capturing button 106. This achieves, as the combined single image, a full-spherical image that does not show the photographer, or a full-spherical image in which the same photographer is shown in two positions.

Figure 4:
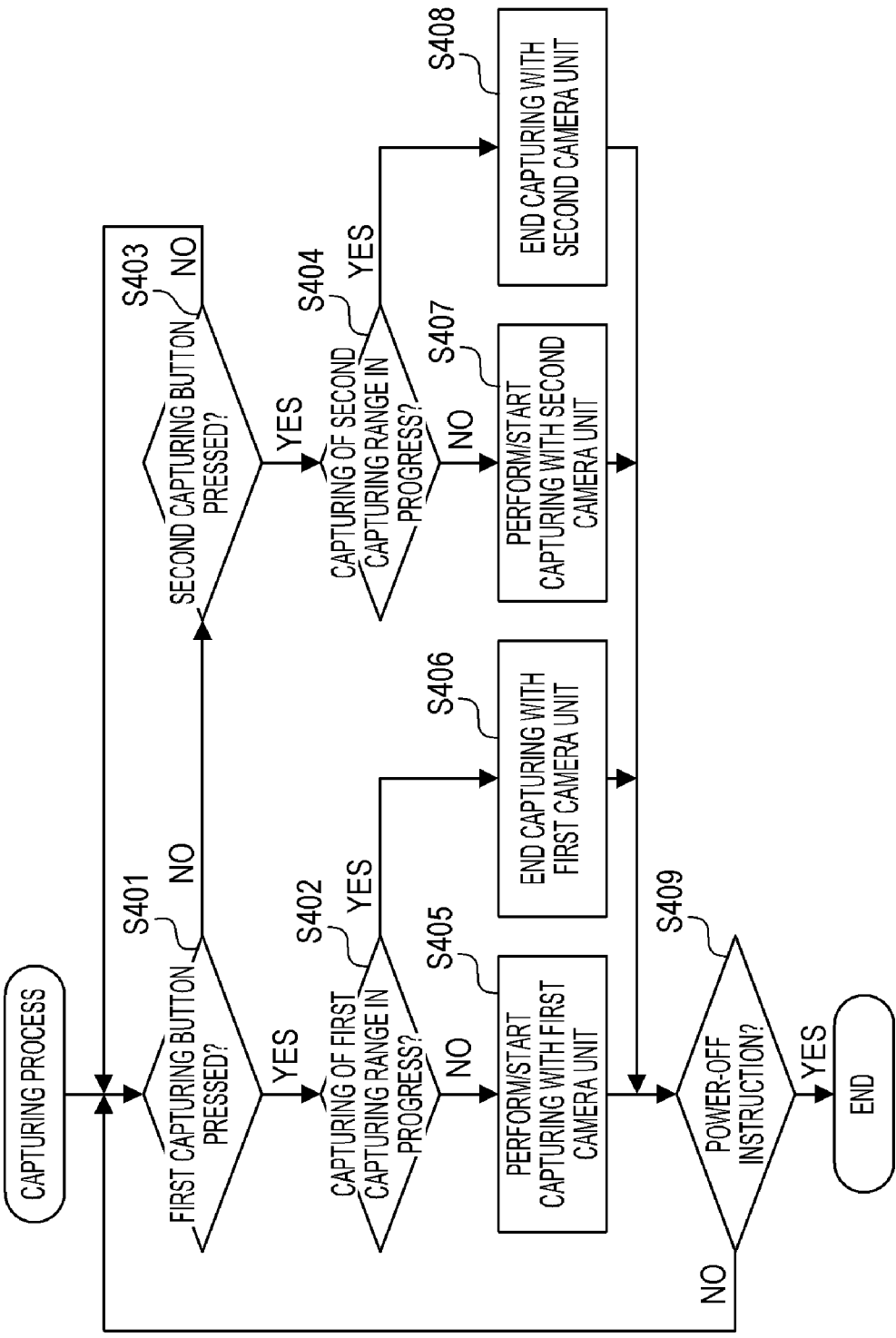
FIG. 4 is a flowchart of the capturing process of the first embodiment.

FIG. 4 is a flowchart showing the details of the capturing process performed by the digital camera 101. This process is performed when the CPU 205 loads a program recorded in the non-volatile memory 209 into the memory 210 and executes the program. For example, the process of FIG. 4 starts when the digital camera 101 is activated.

At S401, the CPU 205 determines whether the first capturing button 103 is pressed. If the first capturing button 103 is pressed, the process proceeds to S402. If not, the process proceeds to S403.

At S402, the CPU 205 determines whether capturing of the first capturing range 310 (capturing with the first camera unit 102) is in progress. If capturing of the first capturing range 310 is in progress, the process proceeds to S406. If not, the process proceeds to S405.

At S405, the CPU 205 performs (starts) capturing with the first camera unit 102.

At S406, the CPU 205 ends the capturing with the first camera unit 102.

At S403, the CPU 205 determines whether the second capturing button 106 is pressed. If the second capturing button 106 is pressed, the process proceeds to S404. If not, the process proceeds to S401.

At S404, the CPU 205 determines whether capturing of the second capturing range 311 (capturing with the second camera unit 105) is in progress. If capturing of the second capturing range 311 is in progress, the process proceeds to S408. If not, the process proceeds to S407.

At S407, the CPU 205 performs (starts) capturing with the second camera unit 105.

At S408, the CPU 205 ends the capturing with the second camera unit 105.

At S409, the CPU 205 determines whether a power-off instruction (power-off operation) is given. If a power-off instruction is given, the CPU 205 ends the capturing process and turns off the digital camera 101. If not, the process proceeds to S401.

As described above, the present embodiment captures an image of the range corresponding to the operated capturing button. This enables the user to intuitively (easily) perform an operation of changing the capturing range to the range in an intended direction (the direction of an image to be captured).

Second Embodiment

A second embodiment of the present invention is now described focusing on the differences from the first embodiment. In the first embodiment, while capturing with the first and second camera units 102 and 105 is in progress, pressing the first capturing button 103 only ends the capturing with the first camera unit 102, and pressing the second capturing button 106 only ends the capturing with the second camera unit 105. In the second embodiment, while capturing with the first and second camera units 102 and 105 is in progress, pressing the first capturing button 103 ends the capturing with both the first and second camera units 102 and 105. Likewise, pressing the second capturing button 106 ends the capturing with both the first and second camera units 102 and 105.

The operation of the present embodiment is now described in detail. When the first capturing button 103 or the second capturing button 106 is pressed while capturing of the first and second capturing ranges 310 and 311 is in progress (FIG. 3D), the CPU 205 ends the capturing with both the first and second camera units 102 and 105 in response to the signal from the pressed capturing button. At this time, the state of the digital camera 101 changes from the state shown in FIG. 3D to the state shown in FIG. 3A. Upon ending the capturing with the first and second camera units 102 and 105, the CPU 205 turns off both the first and second LEDs 104a and 104b.

Figure 5:
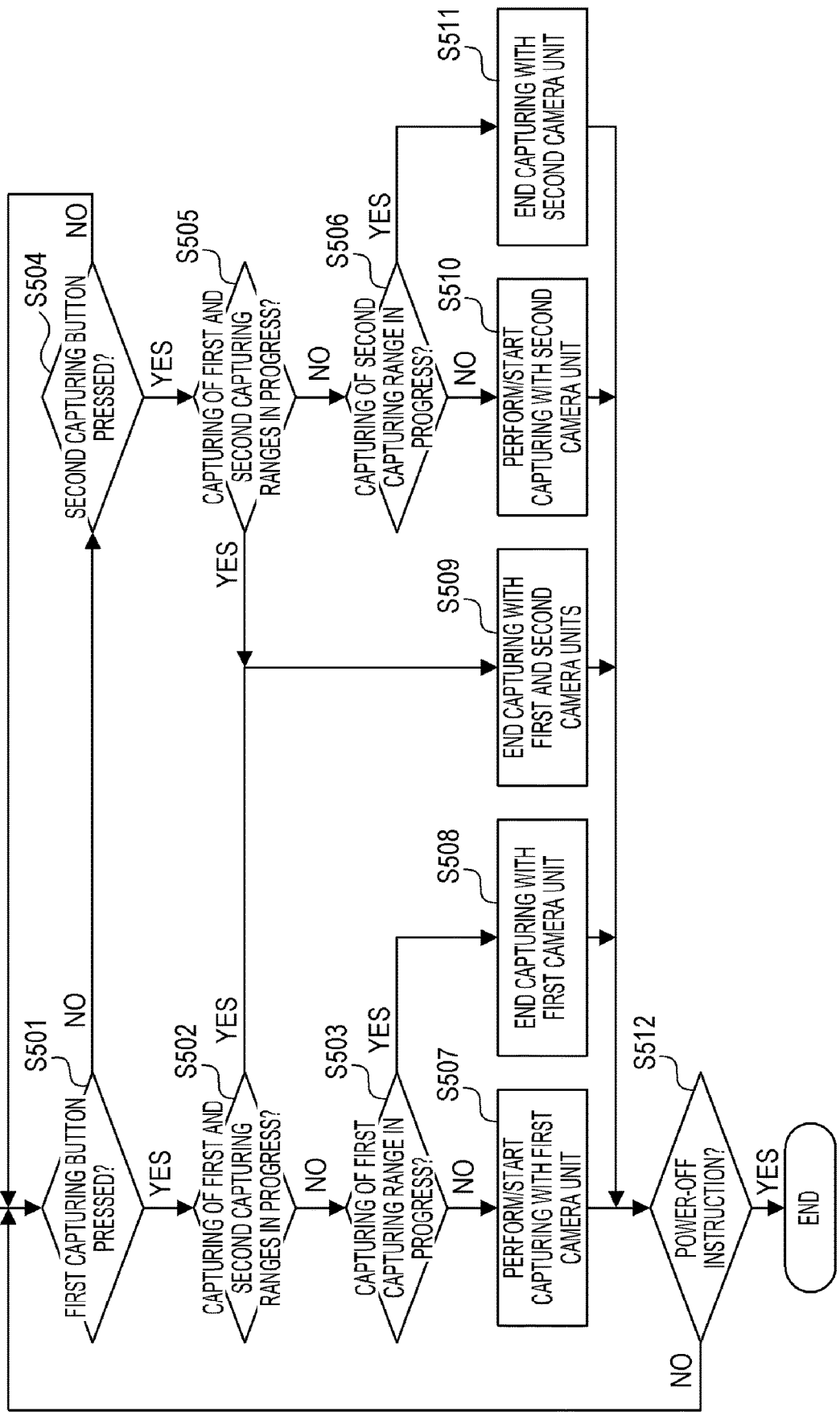
FIG. 5 is a flowchart of the capturing process of the second embodiment.

FIG. 5 is a flowchart showing the details of the capturing process performed by the digital camera 101. This process is performed when the CPU 205 loads a program recorded in the non-volatile memory 209 into the memory 210 and executes the program. For example, the process of FIG. 5 starts when the digital camera 101 is activated.

At S501, the CPU 205 determines whether the first capturing button 103 is pressed. If the first capturing button 103 pressed, the process proceeds to S502. If not, the process proceeds to S504.

At S502, the CPU 205 determines whether both capturing of the first capturing range 310 (capturing with the first camera unit 102) and capturing of the second capturing range 311 (capturing with the second camera unit 105) are in progress. If both are in progress, the process proceeds to S509. If not, the process proceeds to S503.

At S503, the CPU 205 determines whether capturing of the first capturing range 310 is in progress. If capturing of the first capturing range 310 is in progress, the process proceeds to S508. If not, the process proceeds to S507.

At S507, the CPU 205 performs (starts) capturing with the first camera unit 102.

At S508, the CPU 205 ends the capturing with the first camera unit 102.

At S509, the CPU 205 ends both the capturing with the first camera unit 102 and the capturing with the second camera unit 105.

At S504, the CPU 205 determines whether the second capturing button 106 is pressed. If the second capturing button 106 is pressed, the process proceeds to S505. If not, the process proceeds to S501.

At S505, the CPU 205 determines whether both capturing of the first capturing range 310 (capturing with the first camera unit 102) and capturing of the second capturing range 311 (capturing with the second camera unit 105) are in progress. If both are in progress, the process proceeds to S509. If not, the process proceeds to S506.

At S506, the CPU 205 determines whether capturing of the second capturing range 311 is in progress. If capturing of the second capturing range 311 is in progress, the process proceeds to S511. If not, the process proceeds to S510.

At S510, the CPU 205 performs (starts) capturing with the second camera unit 105.

At S511, the CPU 205 ends the capturing with the second camera unit 105.

At S512, the CPU 205 determines whether a power-off instruction (power-off operation) is given. If a power-off instruction is given, the CPU 205 ends the capturing process and turns off the digital camera 101. If not, the process proceeds to S501.

In this embodiment, while capturing with the first and second camera units 102 and 105 is in progress, pressing the first or second capturing button 103 or 106 ends the capturing with both the first and second camera units 102 and 105. The operation for ending the capturing is facilitated since a single operation can end the capturing with both the first and second camera units 102 and 105.

Third Embodiment

A third embodiment of the present invention is now described. The digital camera 101 of the first and second embodiments includes a plurality of camera units (the first and second camera units 102 and 105) and a plurality of capturing buttons (the first and second capturing buttons 103 and 106). The third embodiment provides a camera system that can rotate a single camera unit in pan directions in response to an operation on a single operation member (specific operation member).

Figure 6:
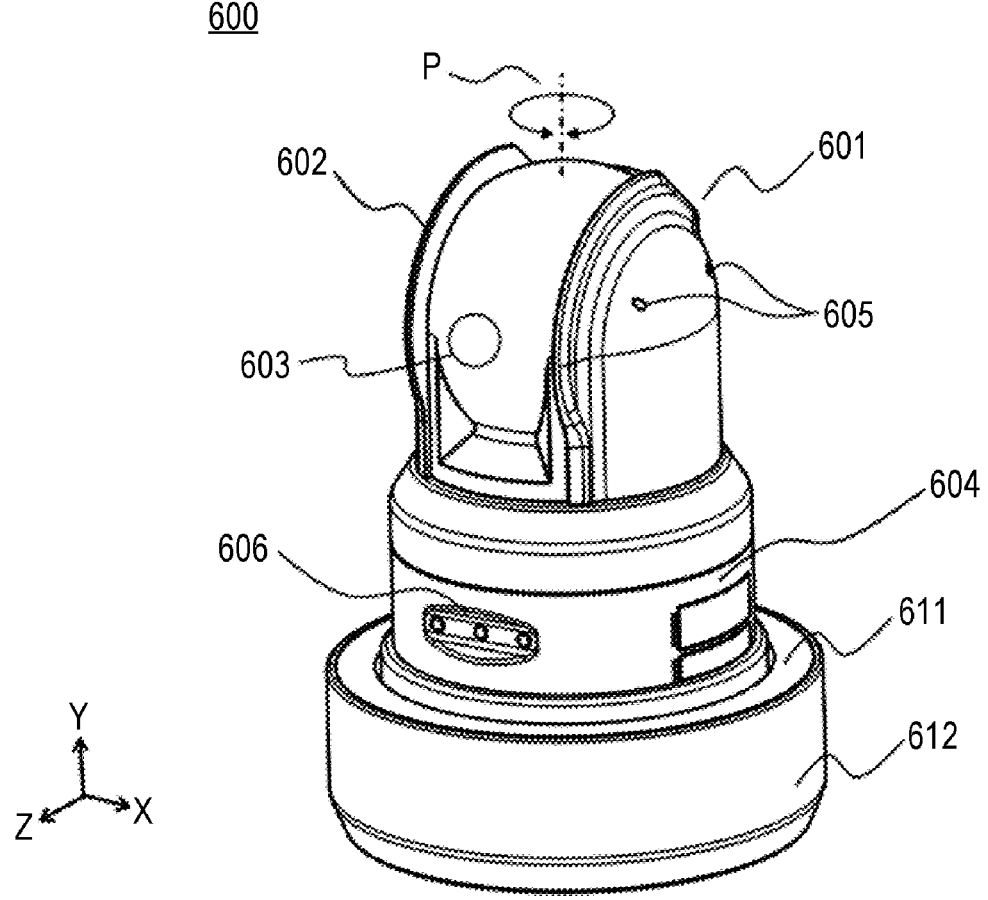
FIG. 6 is an external view of a camera system of third and fourth embodiments.

FIG. 6 is a perspective view showing the appearance of a camera system 600 as an example of an electronic device to which the present invention is applicable. The camera system 600 includes a digital camera (image-capturing device) 601 and a camera holder 611. In FIG. 6, the X-axis represents the width direction (lateral direction) of the camera system 600, the Y-axis represents the height direction (vertical direction) of the camera system 600, and the Z-axis represents the depth direction of the camera system 600.

Figure 9:
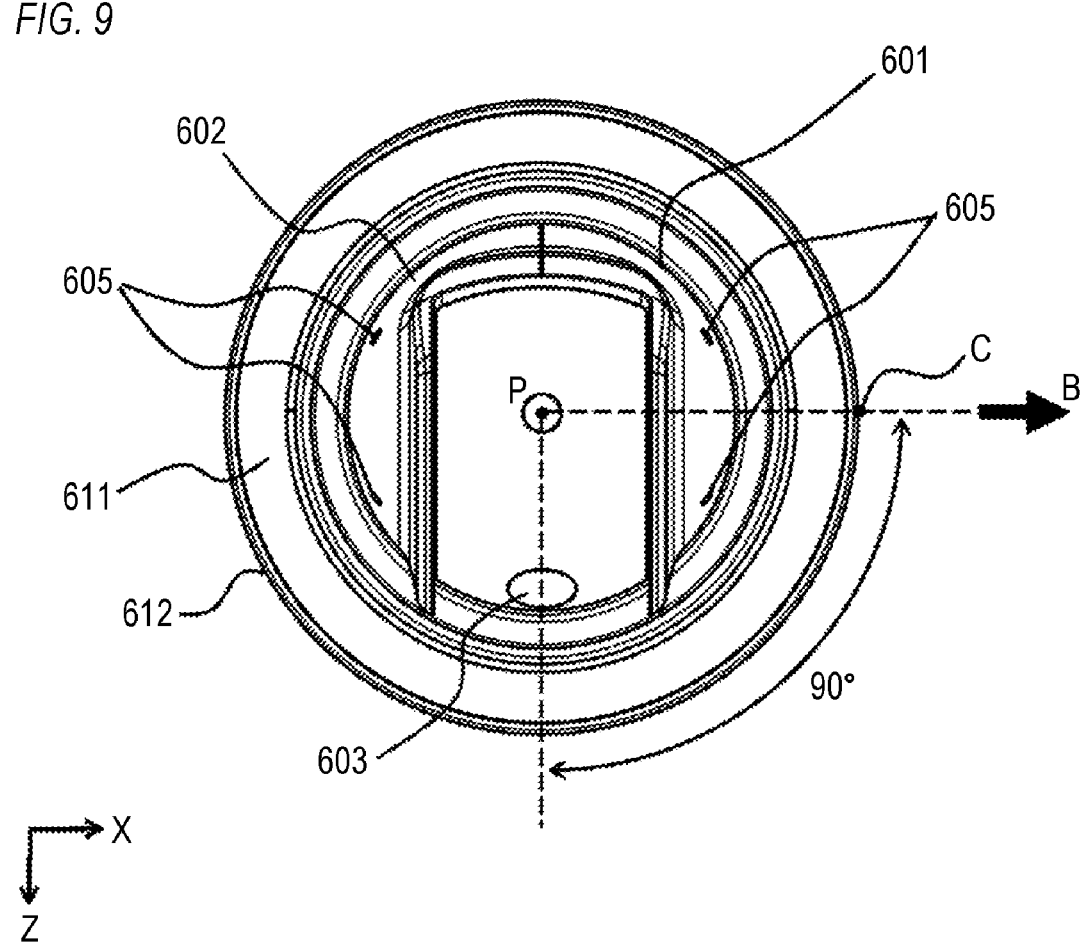
FIG. 9 is a diagram illustrating a method for instructing a capturing direction of the third and fourth embodiments.

The digital camera 601 has a drive unit 602, which can rotate a camera unit 603 in pan directions using an actuator such as a motor (panning). Specifically, the drive unit 602 can rotate the section of the digital camera 601 above its base member 604 about a rotation axis P parallel to the Y-axis. The digital camera 601 also includes components such as microphones 605 and an operation unit 606. The microphones 605 detect sound. The present embodiment includes four microphones 605 arranged on the four sides of the digital camera 601 to determine the direction of the position where the detected sound is emitted (the direction of the sound source) (FIG. 9). The operation unit 606 receives an operation (instruction) by a user. For example, the operation unit 606 includes a plurality of push buttons, such as a power button for instructing power on/off of the digital camera 601.

FIG. 6 shows a state in which the camera unit 603 is orientated in a predetermined default direction, and the optical axis of the camera unit 603 coincides with the positive side of the Z-axis. The drive unit 602 can rotate 360 degrees clockwise and counterclockwise about the rotation axis P from the default direction shown in FIG. 6, so that the optical axis of the camera unit 603 can be directed in all directions.

The digital camera 601 is detachable from the camera holder 611. By attaching (fixing) the digital camera 601 to the camera holder 611, the digital camera 601 can be fixed to a wall, a ceiling, or a desk to capture images, or the digital camera 601 can be worn on the user's body to capture images.

Figure 7:
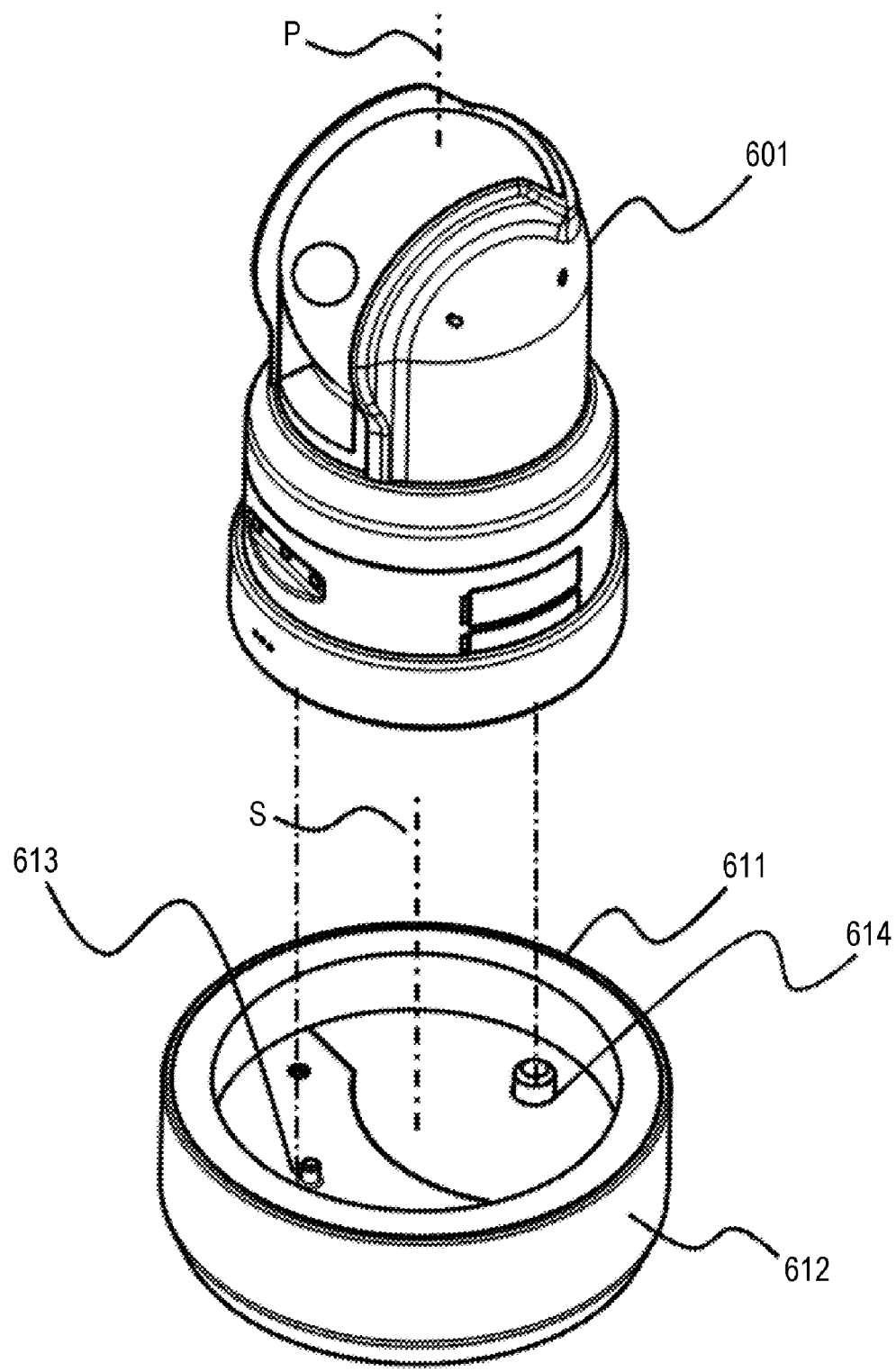
FIG. 7 is an external view of the camera system of the third and fourth embodiments.

FIG. 7 shows a state in which the digital camera 601 is separated from the camera holder 611. As shown in FIG. 7, the camera holder 611 includes on its upper surface a connector 613 for electrically connecting to the digital camera 601 and a screw 614 for fastening (fixing) the camera holder 611 to the digital camera 601.

An annular operation member 612 is arranged on the side surface of the camera holder 611. The digital camera 601 is connected to the camera holder 611 such that the rotation axis P for panning of the digital camera 601 is aligned with the center S of the annular operation member 612. The operation member 612 is a touch sensor and able to detect a position (area) of the operation member 612 touched by a user. When the operation member 612 detects a touched position, the camera holder 611 outputs an instruction to the digital camera 601 so that the digital camera 601 pans and orients the camera unit 603 in the direction corresponding to the touched position.

Figure 8:
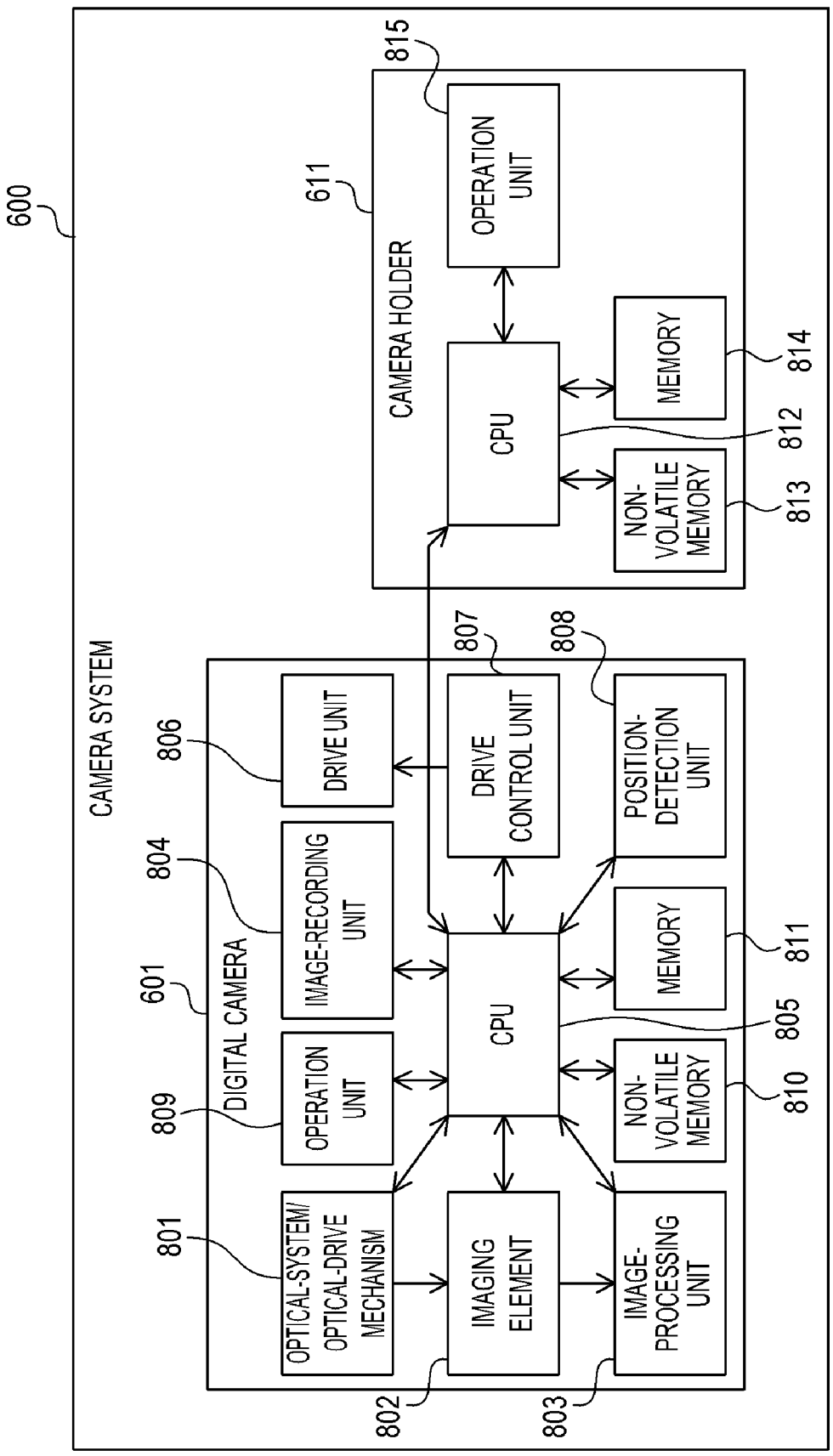
FIG. 8 is a block diagram of the camera system of the third and fourth embodiments.

FIG. 8 is a block diagram showing an example of the configuration of the camera system 600 (the digital camera 601 and the camera holder 611).

The configuration of the digital camera 601 is now described. The camera unit 603 includes an optical-system/optical-drive mechanism 801 and an imaging element 802. The optical-system/optical-drive mechanism 801 forms an optical image of an object on the imaging element 802, and moves its optical system (such as a lens) for zooming, for example. The imaging element 802, which may be a CCD or CMOS element, is an imaging element (imaging sensor) that converts an optical image formed by the optical-system/optical-drive mechanism 801 into an electric signal (image data).

An image-processing unit 803 performs various types of image processing such as the compression of image data obtained by the imaging element 802. An image-recording unit 804 stores the image data (captured images) that is output from the image-processing unit 803.

A CPU 805 is a control unit that controls the entire digital camera 601. A non-volatile memory 810 is a memory that is electrically erasable and recordable, such as an EEPROM. The non-volatile memory 810 records (stores) constants, programs, and other data for the operation of the CPU 805. These programs are used to perform processes of various flowcharts, which will be described below. The CPU 805 performs various processes described below by executing programs stored in the non-volatile memory 810. A memory 811 may be a RAM, and the CPU 805 uses the memory 811 as work memory and loads data such as the constants and variables for the operation of the CPU 805 and a program read from the non-volatile memory 810 in the memory 811.

A drive unit 806 is the drive unit 602 shown in FIG. 6 and pans the digital camera 601. A drive control unit 807 controls the drive unit 806, and controls the panning by the drive unit 806 in response to an instruction from the CPU 805. A position-detection unit 808 detects the position (orientation) of the camera unit 603. An operation unit 809 is the operation unit 606 shown in FIG. 6 and receives an operation (instruction) by a user and outputs a signal corresponding to the performed operation to the CPU 805.

The configuration of the camera holder 611 is now described. An operation unit 815 receives an operation (instruction) by a user and outputs a signal corresponding to the performed operation to a CPU 812. The operation unit 815 includes the operation member 612 shown in FIG. 6, for example.

The CPU 812 is a control unit that controls the entire camera holder 611. A non-volatile memory 813 is a memory that is electrically erasable and recordable, such as an EEPROM. The non-volatile memory 813 records (stores) constants, programs, and other data for the operation of the CPU 812. The CPU 812 performs various processes by executing programs stored in the non-volatile memory 813. A memory 814 may be a RAM, and the CPU 812 uses the memory 814 as work memory and loads data such as the constants and variables for the operation of the CPU 812 and a program read from the non-volatile memory 813 in the memory 814.

In the present embodiment, the digital camera 601 (CPU 805) and the camera holder 611 (CPU 812) communicate (send and receive various data pieces) with each other via the connector 613 shown in FIG. 7. For example, the CPU 812 of the camera holder 611 outputs a signal corresponding to the position detected by the operation member 612 (touched position) to the CPU 805 of the digital camera 601.

Referring to FIG. 9, an operation to instruct a capturing direction is now described. FIG. 9 is a diagram of the camera system 600 as viewed from above (from the positive side of the Y-axis). As described above, the camera unit 603 can be oriented in all directions in 360 degrees about the rotation axis P. The operation member 612 is an annular touch sensor capable of detecting a touch by a user on its entire circumference of 360 degrees. Accordingly, a direction in the drive range of the camera unit 603 can have a one-to-one association with a position on the operation surface (the entire circumference) of the operation member 612, and the present embodiment uses such a one-to-one association.

A situation is now described in which the camera unit 603 in the default direction is to be rotated to the left by 90 degrees and thus oriented in the direction of arrow B. Position C is a position on the operation member 612. When a straight line that is extended through the rotation axis P and parallel to the Z-axis is rotated 90 degrees counterclockwise as viewed in FIG. 9 about the rotation axis P, this straight line intersects with the operation member 612 at Position C. By touching Position C, the user can instruct the direction to orient the camera unit 603 in the direction of arrow B. When Position C is touched, the information on Position C is transmitted from the camera holder 611 to the digital camera 601, the drive unit 602 rotates the camera unit 603 to the left by 90 degrees, and the direction of arrow B becomes the capturing direction. The user can thus intuitively instruct a desired orientation of the camera unit 603 in any direction in 360 degrees.

Figure 10:
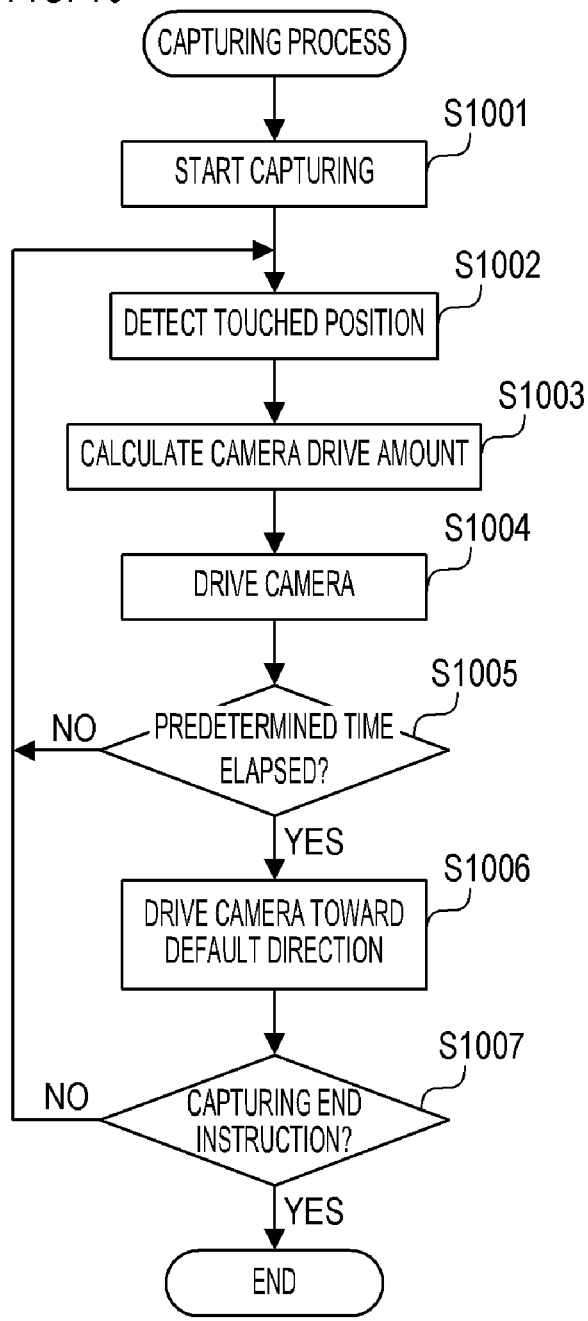
FIG. 10 is a flowchart of the capturing process of the third embodiment.

FIG. 10 is a flowchart showing the details of the capturing process performed by the digital camera 601. This process is performed when the CPU 805 loads a program recorded in the non-volatile memory 810 into the memory 811 and executes the program. For example, the process of FIG. 10 starts when the digital camera 601 and the camera holder 611 are activated.

At S1001, the CPU 805 starts capturing with the camera unit 603.

At S1002, the CPU 805 obtains from the camera holder 611 information on a position detected by the operation member 612 of the camera holder 611 (touched position).

At S1003, based on the information obtained at S1002, the CPU 805 calculates the difference between the orientation corresponding to the touched position and the current orientation of the camera unit 603 as a drive amount (rotation amount) of the camera unit 603.

At S1004, the CPU 805 uses the drive unit 602 to drive (rotate) the camera unit 603 by the drive amount calculated at S1003 (controls driving of the camera unit 603, controls rotation of the camera unit 603). The camera unit 603 is thus oriented in the direction corresponding to the touched position.

At S1005, the CPU 805 determines whether a predetermined time has elapsed without any operation since the camera unit 603 was oriented in the direction corresponding to the touched position. If the predetermined time has elapsed, the process proceeds to S1006. If not, the process proceeds to S1002.

At S1006, the CPU 805 uses the drive unit 602 to drive (rotate) and orient the camera unit 603 in the default direction.

At S1007, the CPU 805 determines whether a capturing end instruction (capturing end operation) is given. The capturing end instruction (capturing end operation) may be a power-off instruction (power-off operation). If a capturing end instruction is given, the CPU 805 ends the capturing process with the camera unit 603 and then turns off the digital camera 601 and the camera holder 611. If not, the process proceeds to S1002.

As described above, the present embodiment captures an image of the range corresponding to the operated position. This enables the user to intuitively (easily) perform an operation of changing the capturing range to the range in an intended direction (the direction of an image to be captured).

The condition at S1006 of FIG. 10 (the condition for returning the orientation of the camera unit 603 to the default direction) may be another predetermined condition that does not involve any operation. For example, a predetermined condition may be a condition that a specific object (such as a person, a vehicle, a face, or a pupil) is no longer detected in the capturing range of the camera unit 603.

In the example described above, the camera holder 611 includes the operation member 612, but the digital camera 601 may include the operation member 612. That is, the operation of instructing the capturing range may be performed on a position on the digital camera, instead of a position on the camera holder.

Fourth Embodiment

A fourth embodiment of the present invention is now described focusing on the differences from the third embodiment. In the third embodiment, the camera unit 603 is driven to be oriented in the default direction when a predetermined condition is satisfied without any operation. In the fourth embodiment, the driving of the camera unit 603 is stopped when a specific condition is satisfied while the camera unit 603 is being driven to be oriented in the default direction.

Figure 11:
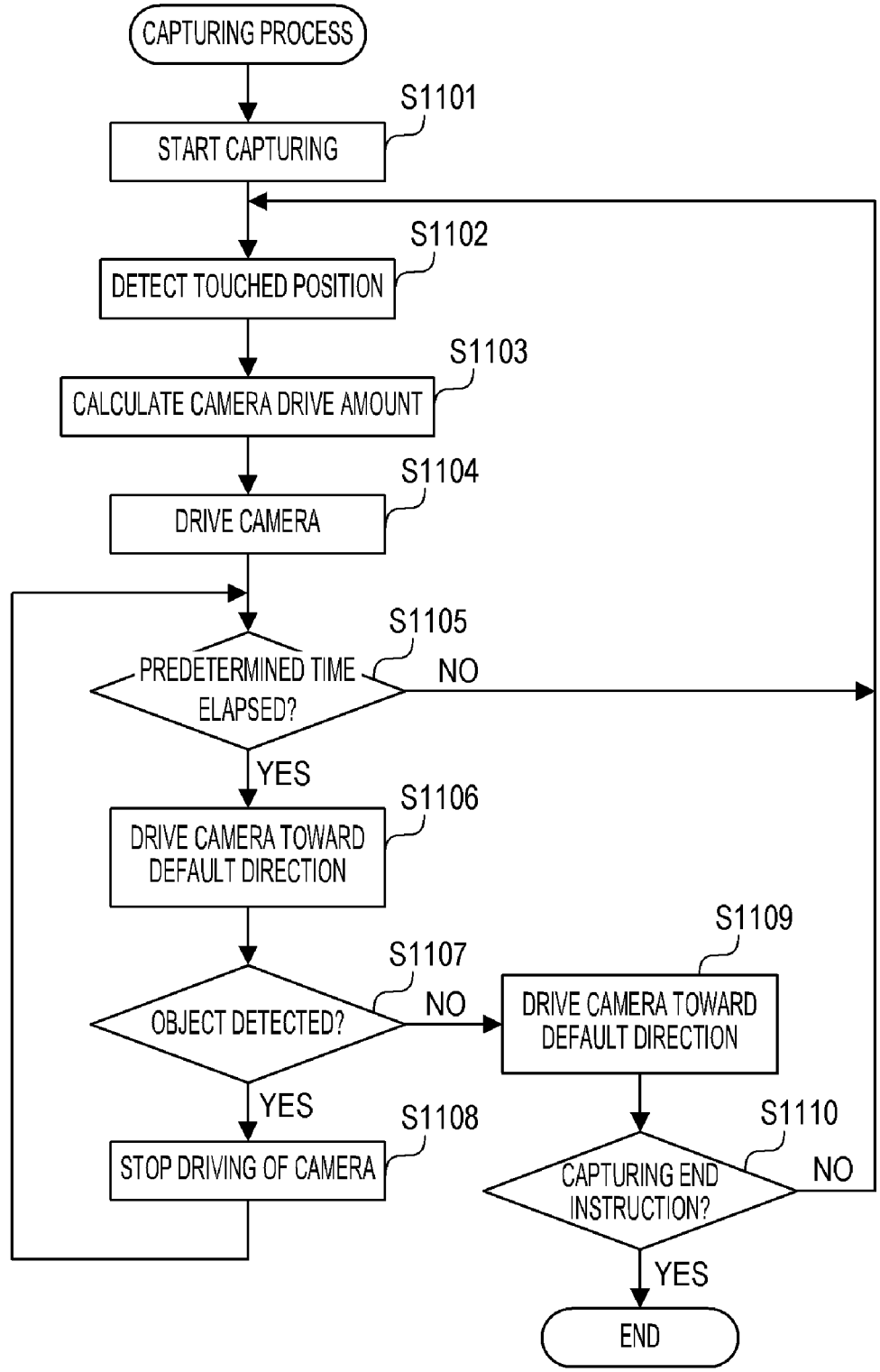
FIG. 11 is a flowchart of the capturing process of the fourth embodiment.

FIG. 11 is a flowchart showing the details of the capturing process performed by the digital camera 601. This process is performed when the CPU 805 loads a program recorded in the non-volatile memory 810 into the memory 811 and executes the program. For example, the process of FIG. 11 starts when the digital camera 601 and the camera holder 611 are activated.

The processing of S1101 to S1105 is the same as the processing of S1001 to S1005 of FIG. 10. At S1105, the CPU 805 determines whether a predetermined time has elapsed without any operation since the camera unit 603 was oriented in the direction corresponding to the touched position. If the predetermined time has elapsed, the process proceeds to S1106. If not, the process proceeds to S1102.

At S1106, the CPU 805 uses the drive unit 602 to start driving (rotating) the camera unit 603 toward the default direction.

At S1107, the CPU 805 determines whether a specific object (such as a person, a vehicle, a face, or a pupil) is detected in the capturing range of the camera unit 603 while the camera unit 603 is being driven to be oriented in the default direction. A specific object may be detected by the image-processing unit 803, for example. If a specific object is detected, the process proceeds to S1108. If not, the process proceeds to S1109.

At S1108, the CPU 805 uses the drive unit 602 to stop the driving (rotation) of the camera unit 603. This allows for capturing and tracking of the specific object, for example.

At S1109, the CPU 805 continues to drive (rotate) the camera unit 603 and orients the camera unit 603 in the default direction.

At S1110, the CPU 805 determines whether a capturing end instruction (capturing end operation) is given. The capturing end instruction (capturing end operation) may be a power-off instruction (power-off operation). If a capturing end instruction is given, the CPU 805 ends the capturing process with the camera unit 603 and then turns off the digital camera 601 and the camera holder 611. If not, the process proceeds to S1102.

In the present embodiment, the driving of the camera unit 603 is stopped when a specific object is detected in the capturing range of the camera unit 603 while the camera unit 603 is being driven to be oriented in the default direction. This increases the opportunities in which images of the specific object is captured, and also enables tracking of the specific object, for example.

In the example described above, the driving of the camera unit 603 is stopped when a specific object is detected in the capturing range of the camera unit 603, but the present invention is not limited to this. The condition for stopping the driving of the camera unit 603 may be a condition different from the condition that a specific object is detected in the capturing range of the camera unit 603. Instead of stopping the driving of the camera unit 603, the camera unit 603 may be driven and oriented in another direction when a specific condition is satisfied. For example, the specific condition may be a condition that each microphone 605 detects a sound. When a sound is detected while the camera unit 603 is being driven to be oriented in the default direction, the camera unit 603 may be driven to be oriented in the direction of the sound. The sound to be detected may or may not be a specific sound such as a sound of a volume higher than a predetermined volume. This configuration allows for capturing of an abnormality accompanied by the generation of sound, and a decisive moment (scene) accompanied by the generation of sound, for example.

Fifth Embodiment

A fifth embodiment of the present invention is now described. The third and fourth embodiments are examples in which the camera unit 603 rotates only in pan directions. The fifth embodiment is an example in which the camera unit 603 rotates in pan directions and tilt directions.

Figure 12:
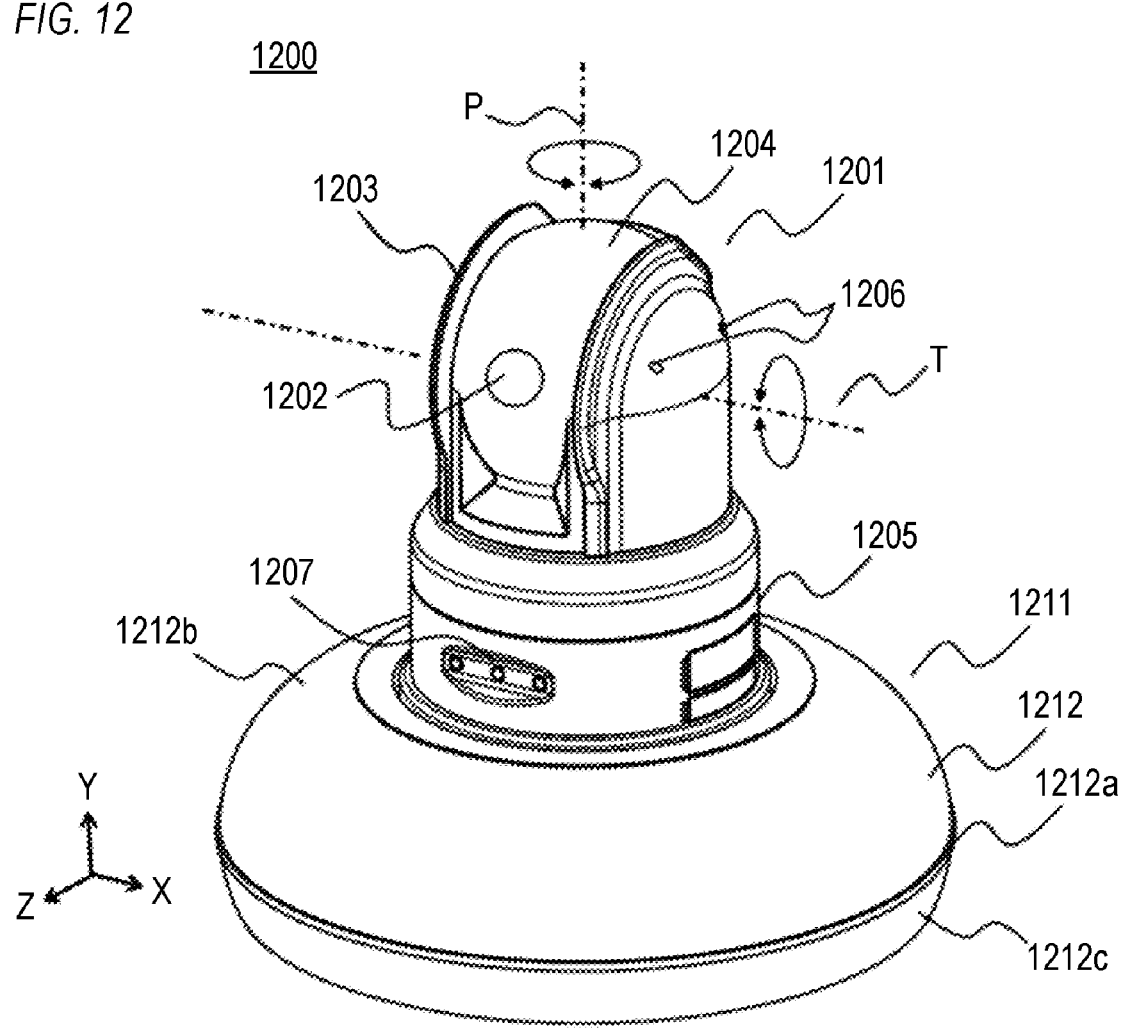
FIG. 12 is an external view of a camera system of a fifth embodiment.

FIG. 12 is a perspective view showing the appearance of a camera system 1200 as an example of an electronic device to which the present invention is applicable. The camera system 1200 includes a digital camera (imaging device) 1201 and a camera holder 1211. In FIG. 12, the X-axis represents the width direction (lateral direction) of the camera system 1200, the Y-axis represents the height direction (vertical direction) of the camera system 1200, and the Z-axis represents the depth direction of the camera system 1200.

The digital camera 1201 is a pan-tilt camera capable of rotating the camera unit 1202 in pan directions and tilt directions using an actuator such as a motor. Specifically, a pan-drive unit 1203 can rotate the section of the digital camera 1201 above its base member 1205 about a rotation axis P parallel to the Y-axis (panning). A tilt-drive unit 1204 can rotate the section of the digital camera 1201 above its base member 1205 about a rotation axis T parallel to the X-axis (tilting). The panning and tilting can be performed independently or simultaneously. Hereinafter, driving including at least one of panning and tilting is referred to as pan-tilt driving. The digital camera 1201 also includes components such as microphones 1206 and an operation unit 1207. The microphones 1206 detect sound. The present embodiment includes four microphones 1206 arranged on the four sides of the digital camera 1201 to determine the direction of the position where the detected sound is emitted (the direction of the sound source). The operation unit 1207 receives an operation (instruction) by a user. For example, the operation unit 1207 includes a plurality of push buttons, such as a power button for instructing power on/off of the digital camera 1201.

FIG. 12 shows a state in which the camera unit 1202 is orientated in a predetermined default direction, and the optical axis of the camera unit 1202 coincides with the positive side of the Z-axis. The pan-drive unit 1203 can rotate 360 degrees clockwise and counterclockwise about the rotation axis P from the default direction shown in FIG. 12, so that the optical axis of the camera unit 1202 can be directed in all directions. The tilt-drive unit 1204 can drive 90 degrees upward and 30 degrees downward from the default direction shown in FIG. 12 about the rotation axis T. By combining panning and tilting, the digital camera 1201 can capture an image of a large range around the digital camera 1201.

The digital camera 1201 is detachable from the camera holder 1211. By attaching (fixing) the digital camera 1201 to the camera holder 1211, the digital camera 1201 can be fixed to a wall, a ceiling, or a desk to capture images, or the digital camera 1201 can be worn on the user's body to capture images.

Figure 13:
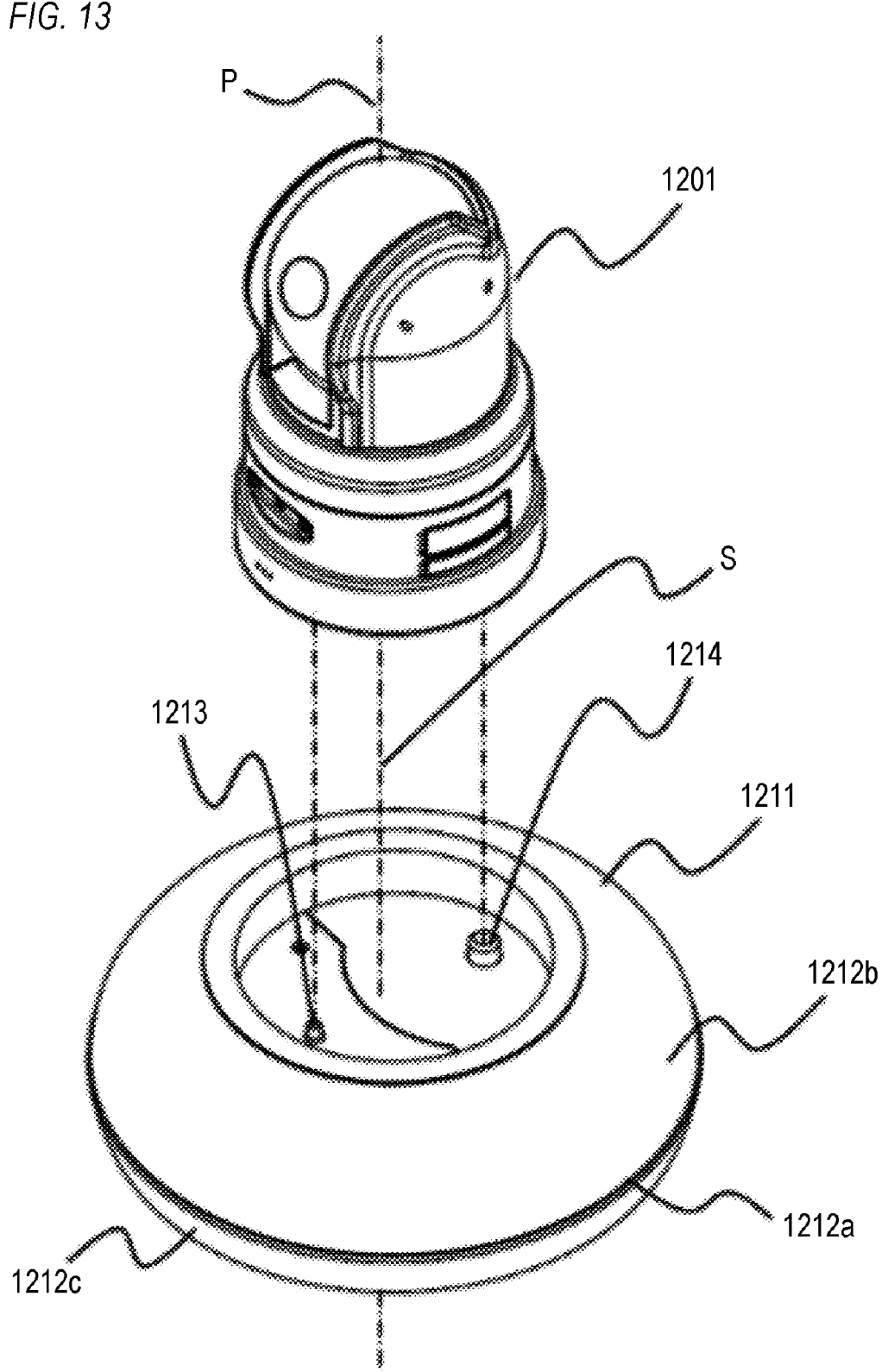
FIG. 13 is an external view of the camera system of the fifth embodiment.

FIG. 13 shows a state in which the digital camera 1201 is separated from the camera holder 1211. As shown in FIG. 13, the camera holder 1211 includes on its upper surface a connector 1213 for electrically connecting to the digital camera 1201 and a screw 1214 for fastening (fixing) the camera holder 1211 to the digital camera 1201.

An annular operation member 1212 is arranged on the side surface of the camera holder 1211. The digital camera 1201 is connected to the camera holder 1211 such that the rotation axis P for panning of the digital camera 1201 is aligned with the center S of the annular operation member 1212. The operation member 1212 is a touch sensor and able to detect the position (area) of the operation member 1212 touched by a user. When the operation member 1212 detects a touched position, the camera holder 1211 outputs an instruction to the digital camera 1201 so that the digital camera 1201 performs pan-tilt driving to orient the camera unit 1202 in the direction corresponding to the touched position.

The operation member 1212 has a first area 1212a, a second area 1212b, and a third area 1212c. The first area 1212a is used to input an instruction only for panning. The second and third areas 1212b and 1212c are each used to input an instruction only for tilting, or to input an instruction for both panning and tilting. The second area 1212b is located above the first area 1212a, and the third area 1212c is located below the first area 1212a. Each of the second and third areas 1212b and 1212c is formed such that its Y-Z cross-section taken along the rotation axis P has an arc shape.

Figure 14:
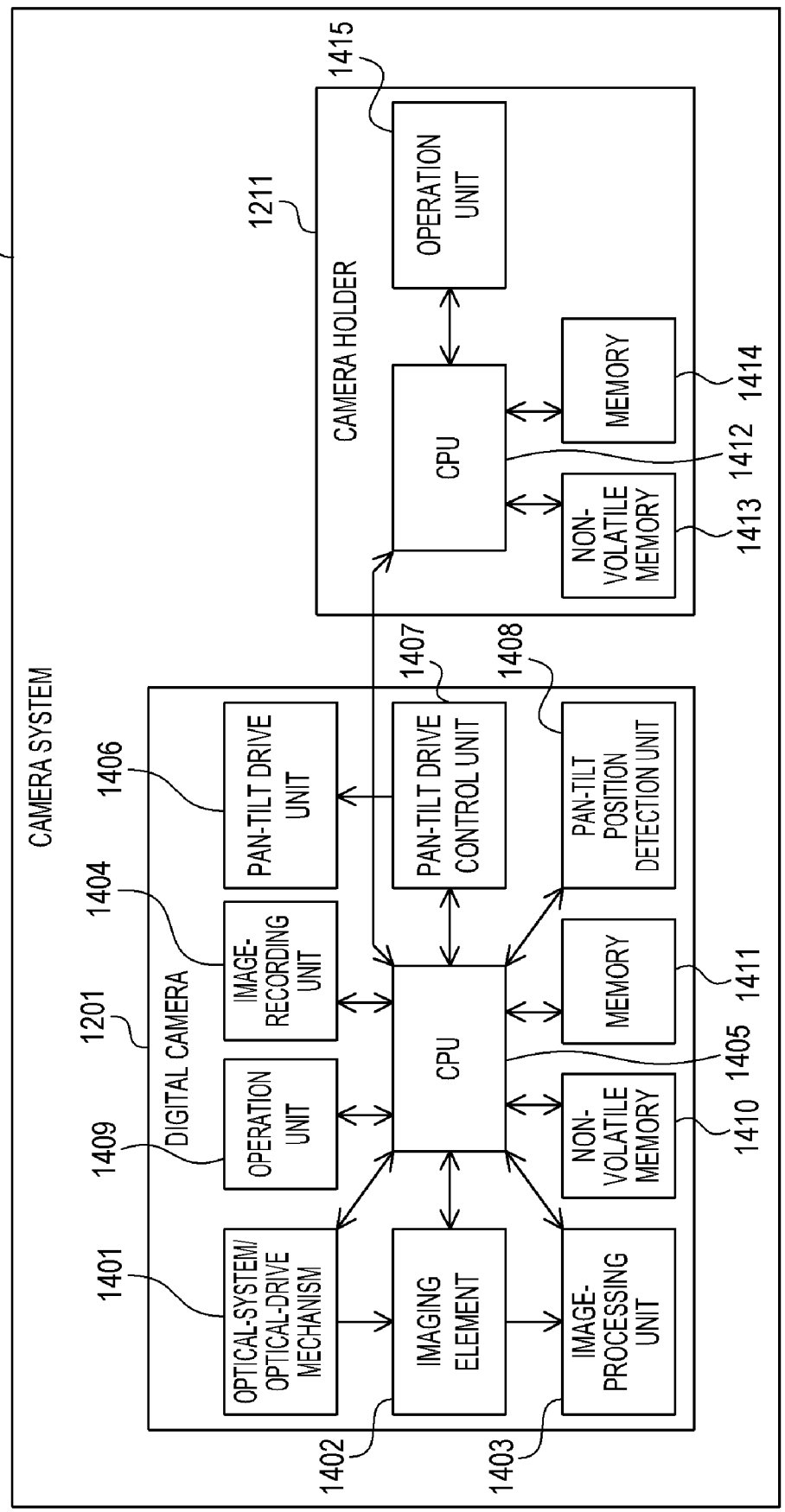
FIG. 14 is a block diagram of the camera system of the fifth embodiment.

FIG. 14 is a block diagram showing an example of the configuration of the camera system 1200 (the digital camera 1201 and the camera holder 1211).

The configuration of the digital camera 1201 is now described. The camera unit 1202 includes an optical-system/optical-drive mechanism 1401 and an imaging element 1402. The optical-system/optical-drive mechanism 1401 forms an optical image of an object on the imaging element 1402, and moves its optical system (such as a lens) for zooming, for example. The imaging element 1402, which may be a CCD or CMOS element, is an imaging element (imaging sensor) that converts an optical image formed by the optical-system/optical-drive mechanism 1401 into an electric signal (image data).

An image-processing unit 1403 performs various types of image processing such as the compression of image data obtained by the imaging element 1402. An image-recording unit 1404 stores the image data (captured images) that is output from the image-processing unit 1403.

A CPU 1405 is a control unit that controls the entire digital camera 1201. A non-volatile memory 1410 is a memory that is electrically erasable and recordable, such as an EEPROM. The non-volatile memory 1410 records (stores) constants, programs, and other data for the operation of the CPU 1405. These programs are used to perform processes of various flowcharts, which will be described below. The CPU 1405 performs various processes described below by executing programs stored in the non-volatile memory 1410. The memory 1411 may be a RAM, and the CPU 1405 uses the memory 1411 as work memory and loads data such as the constants and variables for the operation of the CPU 1405 and a program read from the non-volatile memory 1410 in the memory 1411.

A pan-tilt drive unit 1406 includes the pan-drive unit 1203 and the tilt-drive unit 1204 shown in FIG. 12, and performs pan-tilt driving of the digital camera 1201. A pan-tilt drive control unit 1407 controls the pan-tilt drive unit 1406, and controls the pan-tilt driving by the pan-tilt drive unit 1406 in response to an instruction from the CPU 1405. A pan-tilt position detection unit 1408 detects the orientation of the camera unit 1202 (the position in the pan directions and the position in the tilt directions). An operation unit 1409 is the operation unit 1207 shown in FIG. 12 and receives an operation (instruction) by a user and outputs a signal corresponding to the performed operation to the CPU 1405.

The configuration of the camera holder 1211 is now described. An operation unit 1415 receives an operation (instruction) by a user and outputs a signal corresponding to the performed operation to a CPU 1412. The operation unit 1415 includes the operation member 1212 shown in FIG. 12, for example.

The CPU 1412 is a control unit that controls the entire camera holder 1211. A non-volatile memory 1413 is a memory that is electrically erasable and recordable, such as an EEPROM. The non-volatile memory 1413 records (stores) constants, programs, and other data for the operation of the CPU 1412. The CPU 1412 performs various processes described below by executing programs stored in the non-volatile memory 1413. A memory 1414 may be a RAM, and the CPU 1412 uses the memory 1414 as work memory and loads data such as the constants and variables for the operation of the CPU 1412 and a program read from the non-volatile memory 1413 in the memory 1414.

In the present embodiment, the digital camera 1201 (CPU 1405) and the camera holder 1211 (CPU 1412) communicate (send and receive various data pieces) with each other via the connector 1213 shown in FIG. 13. For example, the CPU 1412 of the camera holder 1211 outputs a signal corresponding to the position detected by the operation member 1212 (touched position) to the CPU 1405 of the digital camera 1201.

Figure 15A:
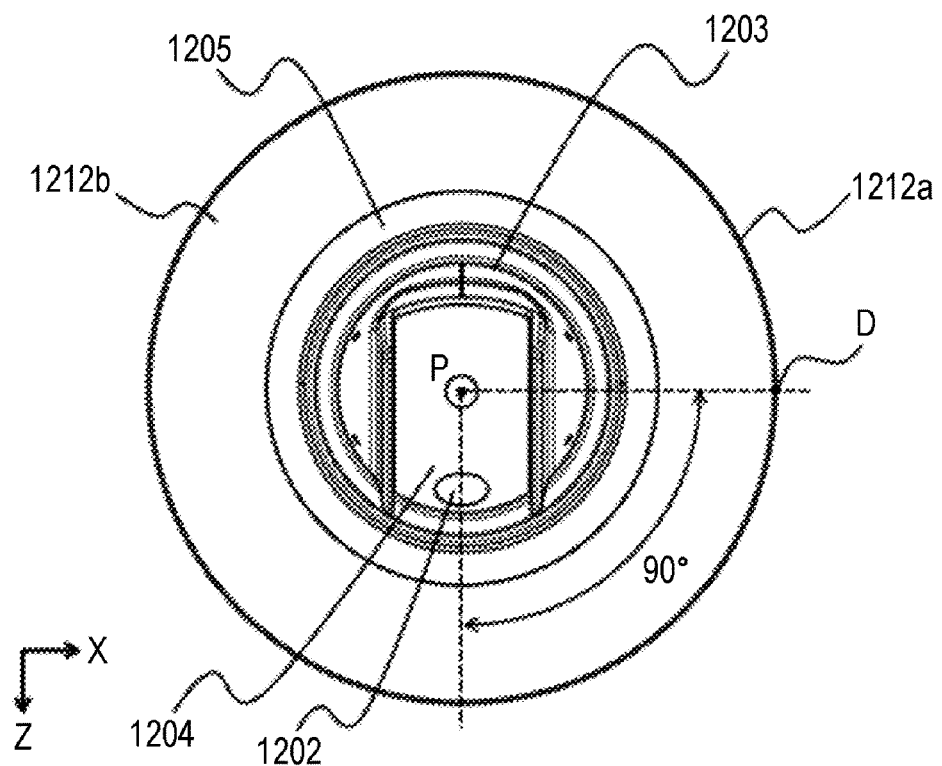
FIGS. 15A and 15B are diagrams illustrating a method for instructing a capturing direction of the fifth embodiment.
Figure 15B:
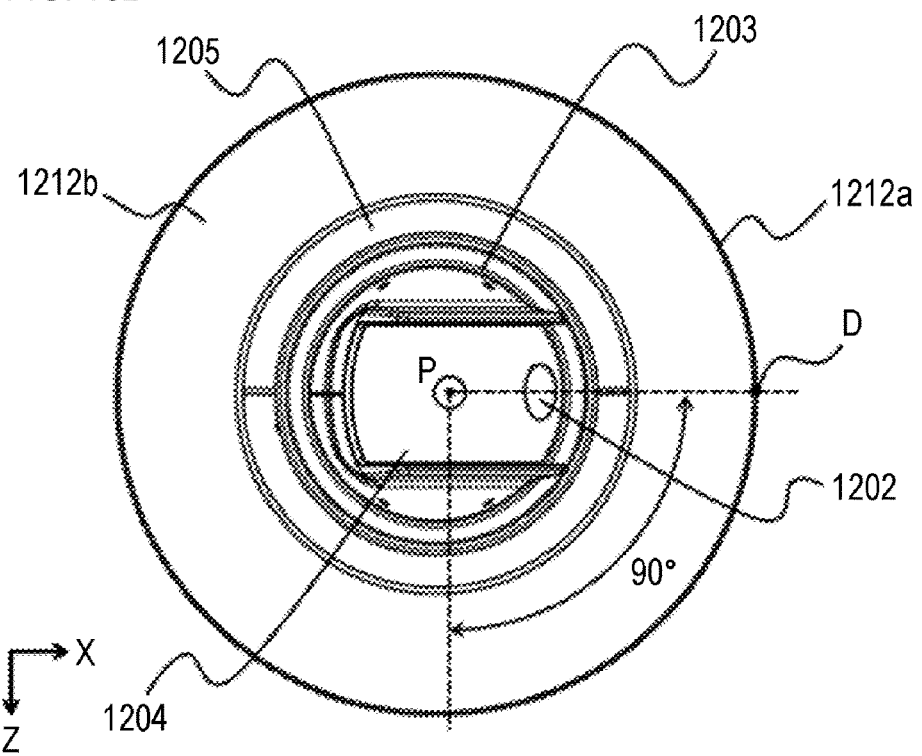

Referring to FIGS. 15A and 15B, an example of an operation to instruct a capturing direction is now described. FIGS. 15A and 15B are diagrams of the camera system 1200 as viewed from above (from the positive side of the Y-axis). As described above, the camera unit 1202 can be oriented in all directions in 360 degrees about the rotation axis P. The operation member 1212 is an annular touch sensor capable of detecting a touch by a user on its entire circumference of 360 degrees in pan directions (in the directions of panning). Accordingly, as for pan directions, a direction in the drive range of the camera unit 1202 can have a one-to-one association with a position on the operation surface (the entire circumference) of the operation member 1212, and the present embodiment uses such a one-to-one association.

A situation is now described in which the camera unit 1202 in the default direction (FIG. 15A) is to be rotated to the left by 90 degrees. Position D is a position on the first area 1212a. When a straight line that is extended through the rotation axis P and parallel to the Z-axis is rotated 90 degrees counterclockwise as viewed in FIG. 15A about the rotation axis P, this straight line intersects with the first area 1212a at Position D. By touching Position D, the user can instruct the direction to rotate the camera unit 1202 to the left by 90 degrees. When Position D is touched, the information on Position D is transmitted from the camera holder 1211 to the digital camera 1201, the pan-drive unit 1203 rotates the camera unit 1202 to the left by 90 degrees as shown in FIG. 15B, and the direction of Position D becomes the capturing direction.

Figure 16A:
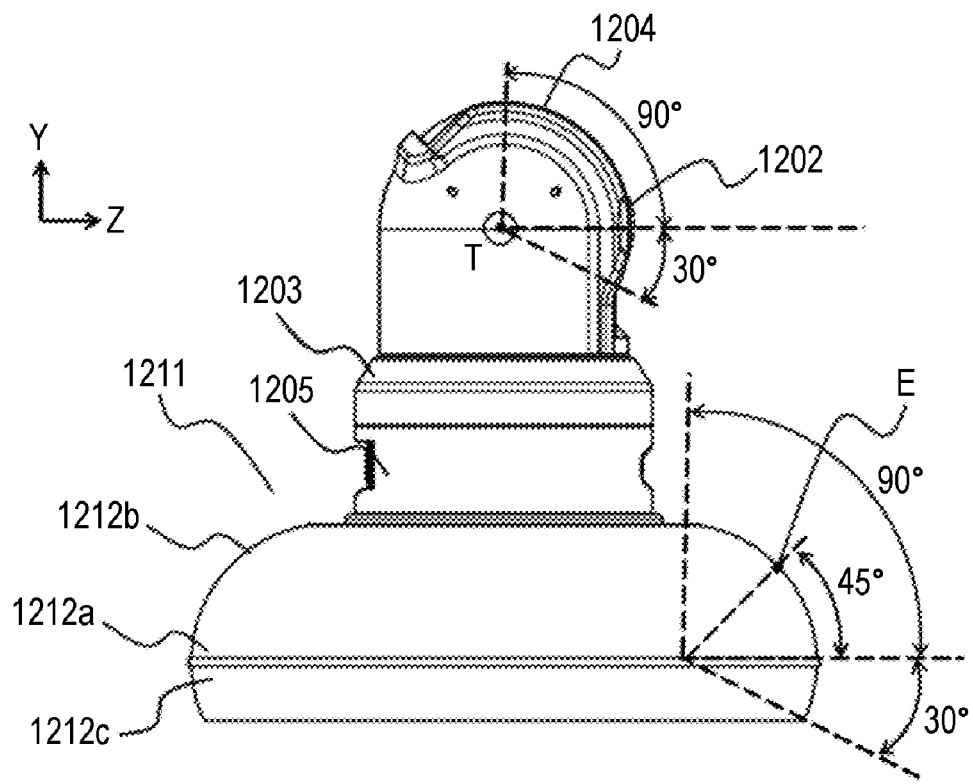
FIGS. 16A and 16B are diagrams illustrating a method for instructing a capturing direction of the fifth embodiment.
Figure 16B:
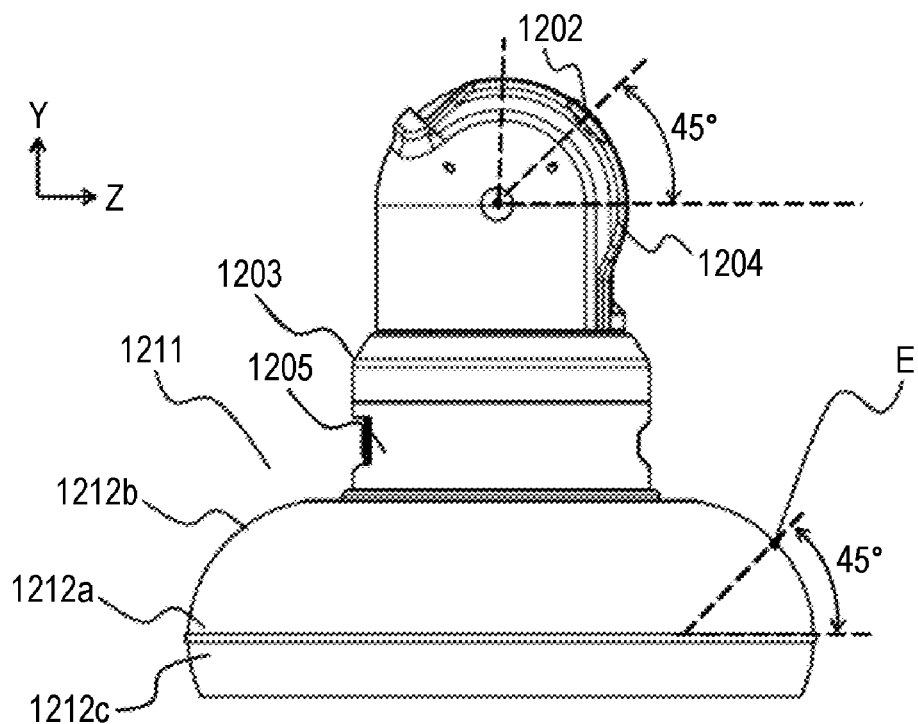

Referring to FIGS. 16A and 16B, another example of an operation to instruct a capturing direction is described. FIGS. 16A and 16B are diagrams of the camera system 1200 as viewed from the right (from the negative side of the X-axis). As described above, the camera unit 1202 can be driven 90 degrees upward and 30 degrees downward about the rotation axis T. The operation member 1212 (the second and third areas 1212b and 1212c) is formed such that its Y-Z cross-section taken along the rotation axis P has an arc shape. The upper second area 1212b is formed such that the central angle of its arc shape is 90 degrees, and the lower third area 1212c is formed such that the central angle of its arc shape is 30 degrees. Accordingly, also for tilt directions (the directions of tilting), a direction in the drive range of the camera unit 1202 can have a one-to-one association with a position on the operation surface of the operation member 1212, and the present embodiment uses such a one-to-one association.

A situation is now described in which the camera unit 1202 in the default direction (FIG. 16A) is to be rotated 45 degrees upward. Position E is a position on the second area 1212b that is located above and separated by 45 degrees from the position where a straight line that is extended through the rotation axis P and parallel to the Z-axis intersects with the first area 1212a. By touching Position E, the user can instruct the direction to rotate the camera unit 1202 upward by 45 degrees. When Position E is touched, the information on Position E is transmitted from the camera holder 1211 to the digital camera 1201, the tilt-drive unit 1204 rotates the camera unit 1202 upward by 45 degrees as shown in FIG. 16B, and the direction of Position E becomes the capturing direction.

Figure 17A:
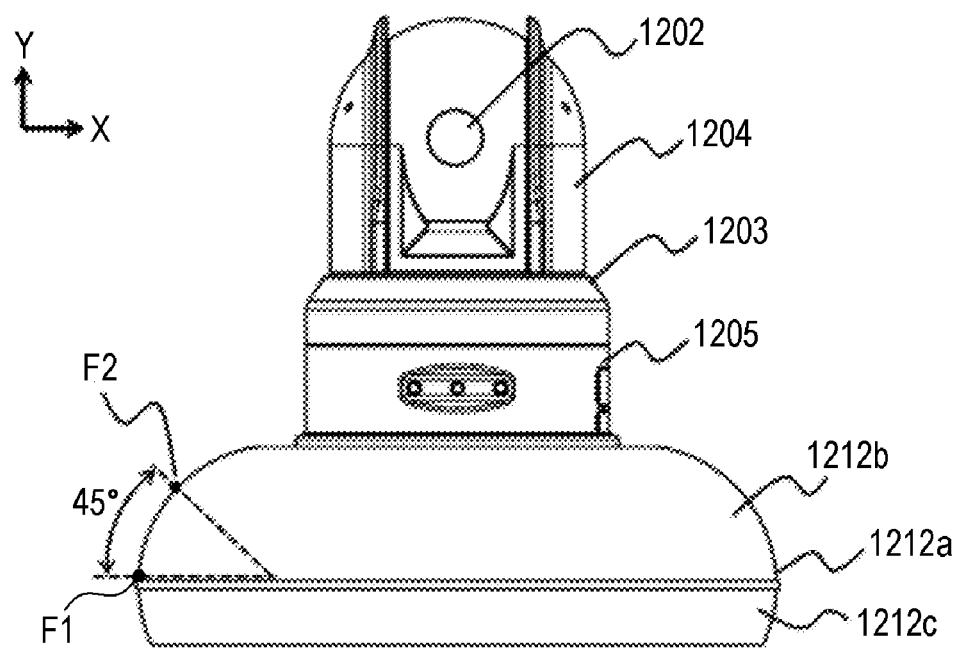
FIGS. 17A and 17B are diagrams illustrating a method for instructing a capturing direction of the fifth embodiment.
Figure 17B:
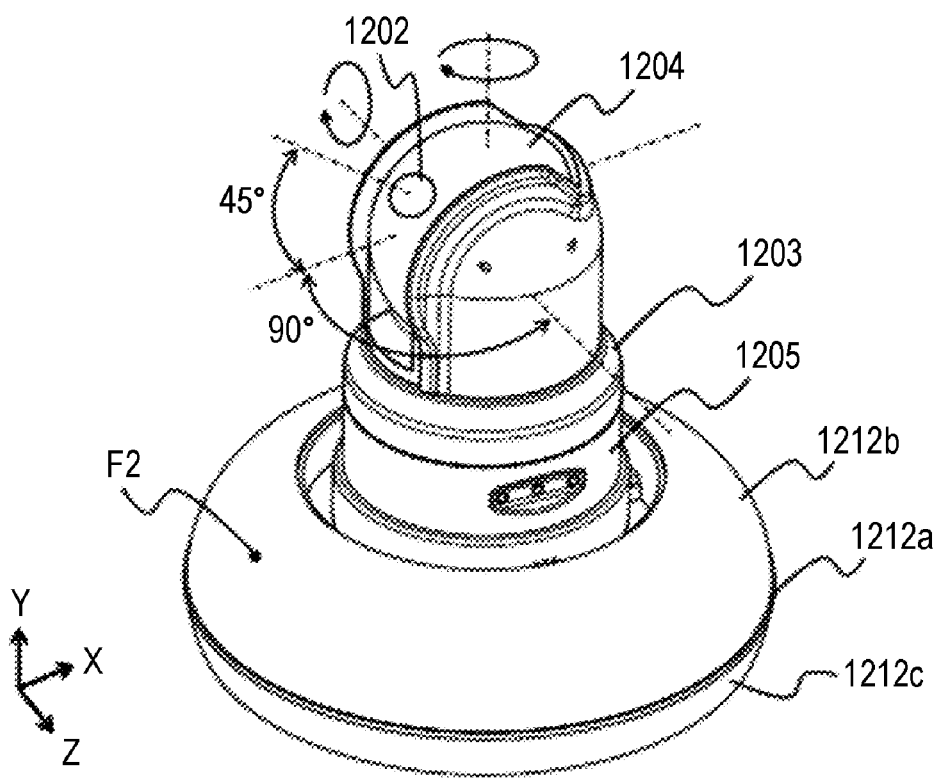

Referring to FIGS. 17A and 17B, another example of an operation to instruct a capturing direction is described. FIG. 17A is a diagram of the camera system 1200 as viewed from the front (from the positive side of the Z-axis). The second and third areas 1212b and 1212c are annular like the first area 1212a and also capable of detecting a touch by a user on its entire circumference of 360 degrees in the pan directions. Accordingly, for pan directions, a direction in the drive range of the camera unit 1202 can have a one-to-one association with a position on the second area 1212b, and the present embodiment uses such a one-to-one association. Likewise, for pan directions, a direction in the drive range of the camera unit 1202 can have a one-to-one association with a position on the third area 1212c, and the present embodiment uses such a one-to-one association.

A situation is now described in which the camera unit 1202 in the default direction (FIG. 17A) is to be rotated 90 degrees to the right and 45 degrees upward. When a straight line that is extended through the rotation axis P and parallel to the Z-axis is rotated 90 degrees clockwise (when the camera system 1200 is viewed from above) about the rotation axis P, this straight line intersects with the first area 1212a at Position F1. Position F2 is a position on the second area 1212b that is located above and separated from Position F1 by 45 degrees. By touching Position F2, the user can instruct the direction to rotate the camera unit 1202 to the right by 90 degrees and upward by 45 degrees. When Position F2 is touched, the information on Position F2 is transmitted from the camera holder 1211 to the digital camera 1201. As shown in FIG. 17B, the pan-drive unit 1203 rotates the camera unit 1202 to the right by 90 degrees, and the tilt-drive unit 1204 rotates the camera unit 1202 upward by 45 degrees, so that the direction of Position F2 becomes the capturing direction.

Figure 18A:
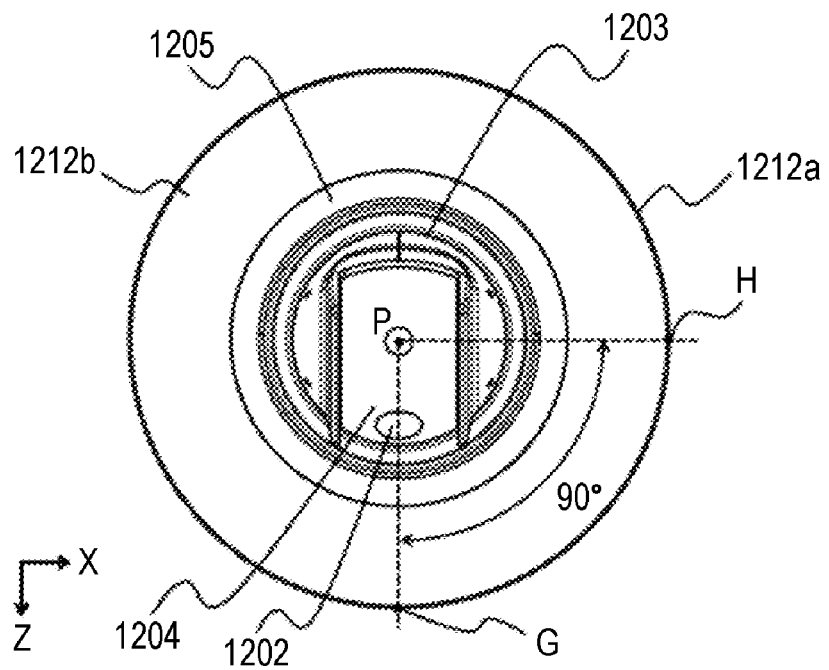
FIGS. 18A and 18B are diagrams illustrating a method for instructing a capturing direction of the fifth embodiment.
Figure 18B:
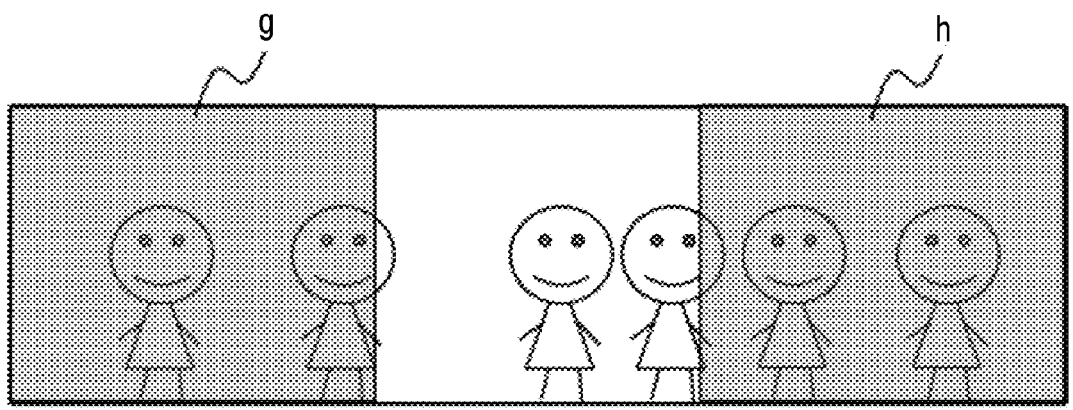

Referring to FIGS. 18A and 18B, another example of an operation to instruct a capturing direction is described. FIG. 18A is a diagram of the camera system 1200 as viewed from above (from the positive side of the Y-axis). The operation member 1212 can detect not only a touch but also an operation of sliding a finger (continuous operation from one position to another, or touch-and-move operation).

A situation is now described in which an image of a range of 90 degrees to the left from the default direction is to be captured. Position G is a position on the first area 1212a at which a straight line that is extended through the rotation axis P and parallel to the Z-axis intersects with the first area 1212a. Position H is a position on the first area 1212a. When a straight line that is extended through the rotation axis P and parallel to the Z-axis is rotated 90 degrees counterclockwise as viewed in FIG. 18A about the rotation axis P, this straight line intersects with the first area 1212a at Position H. When the user slides a finger from Position G to Position H, the information on Position G to Position H is transmitted from the camera holder 1211 to the digital camera 1201, and the pan-drive unit 1203 rotates the camera unit 1202 to the left by 90 degrees. As shown in FIG. 18B, this allows the camera unit 1202 to capture an image while continuously changing the capturing range from the capturing range g corresponding to Position G to the capturing range h corresponding to Position H. For example, when capturing a still image, a panoramic photograph of the range from the capturing ranges g to the capturing range h can be captured. It is also possible to capture a moving image of the range from the capturing range g to the capturing range h while appropriately panning the camera unit 1202 following the movement of the object, for example. The capturing described above can also be performed while tilting or while tilting and panning the camera system in response to an operation of sliding a finger.

Figure 19A:
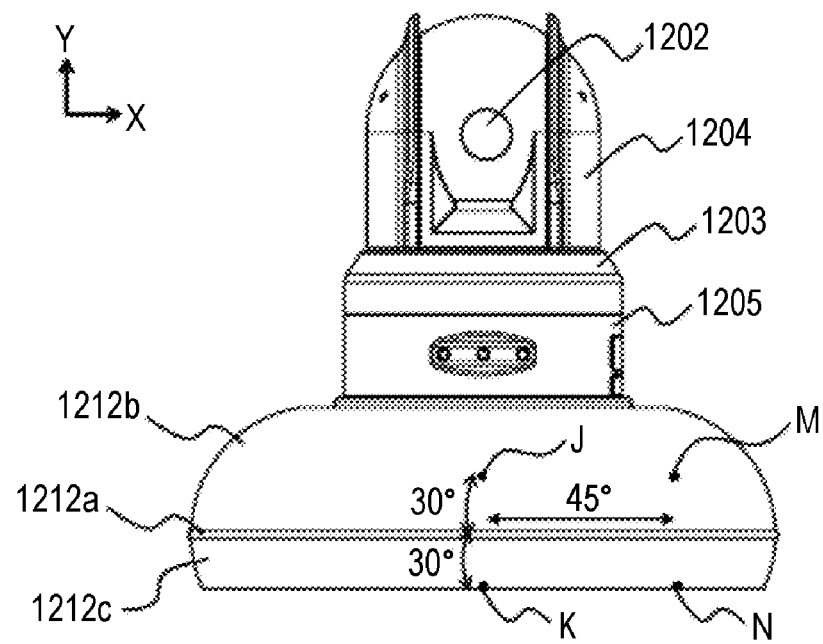
FIGS. 19A and 19B are diagrams illustrating a method for instructing a capturing direction of the fifth embodiment.
Figure 19B:
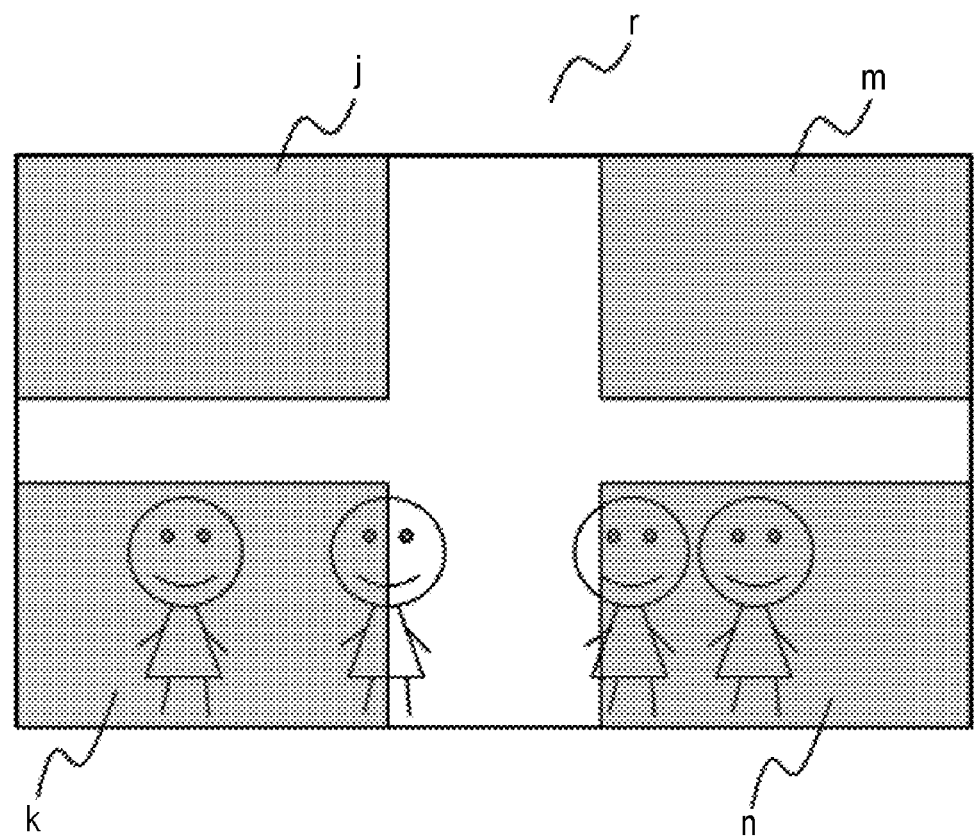

Referring to FIGS. 19A and 19B, another example of an operation to instruct a capturing direction is described. FIG. 19A is a diagram of the camera system 1200 as viewed from the front (from the positive side of the Z-axis). The operation member 1212 can also detect an operation of placing fingers on two points and sliding the fingers.

A situation is now described in which an image of a range of 45 degrees to the left, 30 degrees upward, and 30 degrees downward from the default direction is to be captured. Following Positions J, K, M, and N are used.

Position J: A position on the second area 1212b that is located above and separated by 30 degrees from the position where a straight line that is extended through the rotation axis P and parallel to the Z-axis intersects with the first area 1212a.

Position K: A position on the third area 1212c that is located below and separated by 30 degrees from the position where a straight line that is extended through the rotation axis P and parallel to the Z-axis intersects with the first area 1212a.

Position M: A position on the second area 1212b that is separated from Position J by 90 degrees counterclockwise (when the camera system 1200 is viewed from above) about the rotation axis P.

Position N: A position on the third area 1212c that is separated from Position K by 90 degrees counterclockwise (when the camera system 1200 is viewed from above) about the rotation axis P.

When the user slides fingers from Positions J and K to Positions M and N, the information on Positions J and K to Positions M and N is transmitted from the camera holder 1211 to the digital camera 1201. Then, the pan-drive unit 1203 repeatedly rotates the camera unit 1202 in the range of 45 degrees to the left from the default direction, and the tilt-drive unit 1204 repeatedly rotates the camera unit 1202 in the range of 30 degrees upward and 30 degrees downward from the default direction. As shown in FIG. 19B, this allows the camera unit 1202 to capture an image while continuously changing the capturing range to scan the entire range r including the capturing ranges j, k, m, and n corresponding to the directions of Positions J, K, M, and N. For example, when capturing a still image, a panoramic photograph of the range r can be captured. It is also possible to capture a moving image of the range r while appropriately performing pan-tilt driving of the camera unit 1202 following the movement of the object, for example.

Figure 20:
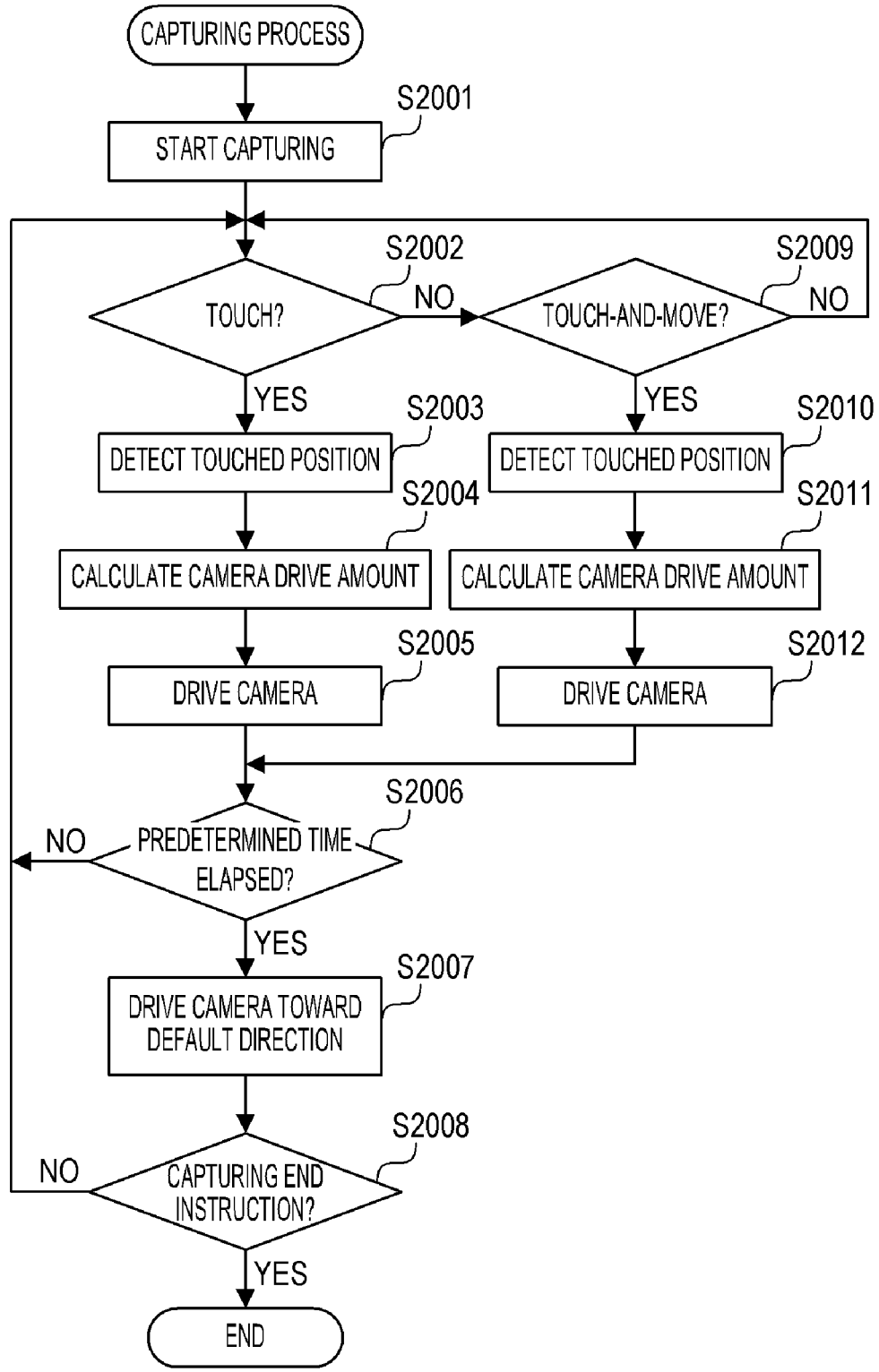
FIG. 20 is a flowchart of the capturing process of the fifth embodiment.

FIG. 20 is a flowchart showing the details of the capturing process performed by the digital camera 1201. This process is performed when the CPU 1405 loads a program recorded in the non-volatile memory 1410 into the memory 1411 and executes the program. For example, the process of FIG. 20 starts when the digital camera 1201 and the camera holder 1211 are activated.

At S2001, the CPU 1405 starts capturing with the camera unit 1202.

At S2002, the CPU 1405 determines whether the operation member 1212 is touched. If the operation member 1212 is touched, the process proceeds to S2003. If not, the process proceeds to S2009. The process proceeds to S2009 not only when the operation member 1212 is not touched but also when a touch operation that started earlier is still in progress.

At S2003, the CPU 1405 obtains from the camera holder 1211 the information on the position detected by the operation member 1212 of the camera holder 1211 (the touched position).

At S2004, based on the information obtained at S2003, the CPU 1405 calculates the difference between the orientation corresponding to the touched position and the current orientation of the camera unit 1202 as a drive amount (rotation amount) of the camera unit 1202.

At S2005, the CPU 1405 uses the pan-tilt drive unit 1406 (the pan-drive unit 1203 and the tilt-drive unit 1204) to drive (rotate) the camera unit 1202 by the drive amount calculated at S2004 (controls driving of the camera unit 1202). The camera unit 1202 is thus oriented in the direction corresponding to the touched position.

At S2006, the CPU 1405 determines whether a predetermined time has elapsed without any operation since the camera unit 1202 was driven. If the predetermined time has elapsed, the process proceeds to S2007. If not, the process proceeds to S2002.

At S2007, the CPU 1405 uses the pan-tilt drive unit 1406 to drive (rotate) and orient the camera unit 1202 in the default direction.

At S2008, the CPU 1405 determines whether a capturing end instruction (capturing end operation) is given. The capturing end instruction (capturing end operation) may be a power-off instruction (power-off operation). If a capturing end instruction is given, the CPU 1405 ends the capturing process with the camera unit 1202 and then turns off the digital camera 1201 and the camera holder 1211. If not, the process proceeds to S2002.

At S2009, the CPU 1405 determines whether a touch-and-move operation (operation of sliding a finger) is performed on the operation member 1212. If a touch-and-move operation is performed, the process proceeds to S2010. If not, the process proceeds to S2002.

At S2010, the CPU 1405 obtains from the camera holder 1211 the information on the position currently detected by the operation member 1212 of the camera holder 1211 (the position currently touched).

At S2011, based on the information obtained at S2010, the CPU 1405 calculates the difference between the orientation corresponding to the position that is currently touched and the current orientation of the camera unit 1202 as a drive amount (rotation amount) of the camera unit 1202.

At S2012, the CPU 1405 uses the pan-tilt drive unit 1406 (the pan-drive unit 1203 and the tilt-drive unit 1204) to drive (rotate) the camera unit 1202 by the drive amount calculated at S2011 (controls driving of the camera unit 1202). The camera unit 1202 is thus oriented in the direction corresponding to the position that is currently touched. Accordingly, during the touch-and-move operation, the orientation of the camera unit 1202 changes along the trajectory corresponding to the trajectory of the touched position.

As described above, in the same manner as the third embodiment, the present embodiment captures an image of the range corresponding to the operated position. This enables the user to intuitively (easily) perform an operation of changing the capturing range to the range in an intended direction (the direction of an image to be captured). Furthermore, the capturing range is changed not only in a pan direction according to the pan component (the component in the pan direction) of the operated position, but also changed in a tilt direction according to the tilt component (the component in the tilt direction) of the operated position. This allows the capturing range to be changed over a larger range than the third embodiment.

The various controls that are performed by the CPUs of the digital camera in the foregoing description may be performed by a single piece of hardware. Alternatively, processes may be shared by a plurality of pieces of hardware (e.g., a plurality of processors and circuits) to control the entire device.

Some preferred embodiments of the present invention are described above in detail, but the present invention is not limited to these specific embodiments, and various embodiments within the scope of the present invention are also included in the present invention. The foregoing embodiments are merely illustrative embodiments of the present invention, and the embodiments may be combined as appropriate.

The foregoing embodiments are examples in which the present invention is applied to a digital camera and a camera system, but the present invention is not limited to these examples and is applicable to any electronic device including an imaging unit that can capture images of first and second capturing ranges. For example, the present invention is applicable to personal computers, PDAs, mobile phones, portable image viewers, printer devices, digital photo frames, music players, game machines, and electronic book readers. The present invention is also applicable to video players, display devices (including projection devices), tablet terminals, smartphones, AI speakers, home appliances, and in-vehicle devices.

The present invention allows a user to intuitively (easily) perform an operation of changing the capturing range to the range in an intended direction (the direction of an image to be captured).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-037682, filed on Mar. 5, 2020, which is hereby incorporated by reference herein in its entirety.

What is claimed is:

1. An electronic device comprising:
   at least one image sensor configured to be able of capturing an image of a first capturing range and an image of a second capturing range different from the first capturing range;
   a processor; and
   a memory storing a program which, when executed by the processor, causes the electronic device to
   in response to an operation on a first position on a side, which is oriented in a first direction, of the electronic device, capture an image of the first capturing range by the at least one image sensor,
   in a case where capturing of an image of the first capturing range is not performed, start capturing of an image of the first capturing range in response to an operation on the first position,
   in a case where capturing of an image of the first capturing range is performed, end the capturing of an image of the first capturing range in response to an operation on the first position,
   in response to an operation on a second position on a side, which is oriented in a second direction different from the first direction, of the electronic device, capture an image of the second capturing range by the at least one image sensor,
   in a case where capturing of an image of the second capturing range is not performed, start capturing of an image of the second capturing range in response to an operation on the second position, and
   in case where capturing of an image of the second capturing range is performed, end the capturing of an image of the second capturing range in response to an operation on the second position.

2. An electronic device comprising:
   at least one image sensor configured to be able of capturing an image of a first capturing range and an image of a second capturing range different from the first capturing range;
   a processor; and
   a memory storing a program which, when executed by the processor, causes the electronic device to
   in response to an operation on a first position on a side, which is oriented in a first direction, of the electronic device, capture an image of the first capturing range by the at least one image sensor,
   in response to an operation on a second position on a side, which is oriented in a second direction different from the first direction, of the electronic device, capture an image of the second capturing range by the at least one image sensor, and
   in a case where an operation on the first position and an operation on the second position are performed together, perform capturing of an image of the first capturing range together with capturing of an image of the second capturing range, and record a single image in which the captured image of the first capturing range and the captured image of the second capturing range are combined.

3. An electronic device comprising:
   at least one image sensor configured to be able of capturing an image of a first capturing range and an image of a second capturing range different from the first capturing range;
   a processor; and
   a memory storing a program which, when executed by the processor, causes the electronic device to
   in response to an operation on a first position on a side, which is oriented in a first direction, of the electronic device, capture an image of the first capturing range by the at least one image sensor,
   in response to an operation on a second position on a side, which is oriented in a second direction different from the first direction, of the electronic device, capture an image of the second capturing range by the at least one image sensor, and
   in a case where an operation on the first position and an operation on the second position are performed in succession, perform capturing of an image of the first capturing range and capturing of an image of the second capturing range in succession, and record a single image in which the captured image of the first capturing range and the captured image of the second capturing range are combined.

4. An electronic device comprising:
   at least one image sensor configured to be able of capturing an image of a first capturing range and an image of a second capturing range different from the first capturing range;
   a processor; and
   a memory storing a program which, when executed by the processor, causes the electronic device to
   in response to an operation on a first position on a side, which is oriented in a first direction, of the electronic device, capture an image of the first capturing range by the at least one image sensor,
   in response to an operation on a second position on a side, which is oriented in a second direction different from the first direction, of the electronic device, capture an image of the second capturing range by the at least one image sensor,
   in a case where capturing of an image of the first capturing range is not performed, start capturing of an image of the first capturing range in response to an operation on the first position,
   in a case where capturing of an image of the second capturing range is not performed, start capturing of an image of the second capturing range in response to an operation on the second position, and
   in a case where capturing of an image of the first capturing range and capturing of an image of the second capturing range are performed together, end both the capturing of an image of the first capturing range and the capturing of an image of the second capturing range in response to an operation on the first position or the second position.

5. An electronic device comprising:
   at least one image sensor configured to be able of capturing an image of a first capturing range and an image of a second capturing range different from the first capturing range;

a processor; and a memory storing a program which, when executed by the processor, causes the electronic device to in response to an operation on a first position on a side, which is oriented in a first direction, of the electronic device, capture an image of the first capturing range by the at least one image sensor, and in response to an operation on a second position on a side, which is oriented in a second direction different from the first direction, of the electronic device, capture an image of the second capturing range by the at least one image sensor, wherein the electronic device further comprises:

a first light source configured to notify that capturing of an image of the first capturing range is performed; and a second light source configured to notify that capturing of an image of the second capturing range is performed, the first light source is located at a position visible from a side corresponding to the first capturing range, and the second light source is located at a position visible from a side corresponding to the second capturing range.

6. An electronic device comprising:

at least one image sensor configured to be able of capturing an image of a first capturing range and an image of a second capturing range different from the first capturing range;

a processor; and a memory storing a program which, when executed by the processor, causes the electronic device to in response to an operation on a first position on a side, which is oriented in a first direction, of the electronic device, capture an image of the first capturing range by the at least one image sensor, and in response to an operation on a second position on a side, which is oriented in a second direction different from the first direction, of the electronic device, capture an image of the second capturing range by the at least one image sensor, wherein the electronic device further comprises:

a first light source configured to notify that capturing of an image of the first capturing range is performed; and a second light source configured to notify that capturing of an image of the second capturing range is performed, the first light source is located at a position visible from a side opposite to the first capturing range, and the second light source is located at a position visible from a side opposite to the second capturing range.

7. A method for use in an electronic device including at least one image sensor configured to be able of capturing an image of a first capturing range and an image of a second capturing range different from the first capturing range, comprising the steps of:

in response to an operation on a first position on a side, which is oriented in a first direction, of the electronic device, capturing an image of the first capturing range by the at least one image sensor, in a case where capturing of an image of the first capturing range is not performed, starting capturing of an image of the first capturing range in response to an operation on the first position, in a case where capturing of an image of the first capturing range is performed, ending the capturing of an image of the first capturing range in response to an operation on the first position, in response to an operation on a second position on a side, which is oriented in a second direction different from the first direction, of the electronic device, capturing an image of the second capturing range by the at least one image sensor, in a case where capturing of an image of the second capturing range is not performed, starting capturing of an image of the second capturing range in response to an operation on the second position, and in case where capturing of an image of the second capturing range is performed, ending the capturing of an image of the second capturing range in response to an operation on the second position.

8. A non-transitory computer readable medium that stores a program, wherein the program causes a computer to execute a method for use in an electronic device including at least one image sensor configured to be able of capturing an image of a first capturing range and an image of a second capturing range different from the first capturing range, comprising the steps of:

in response to an operation on a first position on a side, which is oriented in a first direction, of the electronic device, capturing an image of the first capturing range by the at least one image sensor, in a case where capturing of an image of the first capturing range is not performed, starting capturing of an image of the first capturing range in response to an operation on the first position, in a case where capturing of an image of the first capturing range is performed, ending the capturing of an image of the first capturing range in response to an operation on the first position, in response to an operation on a second position on a side, which is oriented in a second direction different from the first direction, of the electronic device, capturing an image of the second capturing range by the at least one image sensor, in a case where capturing of an image of the second capturing range is not performed, starting capturing of an image of the second capturing range in response to an operation on the second position, and in case where capturing of an image of the second capturing range is performed, ending the capturing of an image of the second capturing range in response to an operation on the second position.

9. A method for use in an electronic device including at least one image sensor configured to be able of capturing an image of a first capturing range and an image of a second capturing range different from the first capturing range, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, and in a case where an operation on the first position and an operation on the second position are performed together, performing capturing of an image of the first capturing range together with capturing of an image of the second capturing range, and recording a single image in which the captured image of the first capturing range and the captured image of the second capturing range are combined.

10. A non-transitory computer readable medium that stores a program, wherein the program causes a computer to execute a method for use in an electronic device including at least one image sensor configured to be able of capturing an image of a first capturing range and an image of a second capturing range different from the first capturing range, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, and in a case where an operation on the first position and an operation on the second position are performed together, performing capturing of an image of the first capturing range together with capturing of an image of the second capturing range, and recording a single image in which the captured image of the first capturing range and the captured image of the second capturing range are combined.

11. A method for use in an electronic device including at least one image sensor configured to be able of capturing an image of a first capturing range and an image of a second capturing range different from the first capturing range, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, and in a case where an operation on the first position and an operation on the second position are performed in succession, performing capturing of an image of the first capturing range and capturing of an image of the second capturing range in succession, and recording a single image in which the captured image of the first capturing range and the captured image of the second capturing range are combined.

12. A non-transitory computer readable medium that stores a program, wherein the program causes a computer to execute a method for use in an electronic device including at least one image sensor configured to be able of capturing an image of a first capturing range and an image of a second capturing range different from the first capturing range, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, and in a case where an operation on the first position and an operation on the second position are performed in succession, performing capturing of an image of the first capturing range and capturing of an image of the second capturing range in succession, and recording a single image in which the captured image of the first capturing range and the captured image of the second capturing range are combined.

13. A method for use in an electronic device including at least one image sensor configured to be able of capturing an image of a first capturing range and an image of a second capturing range different from the first capturing range, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, in a case where capturing of an image of the first capturing range is not performed, starting capturing of an image of the first capturing range in response to an operation on the first position, in a case where capturing of an image of the second capturing range is not performed, starting capturing of an image of the second capturing range in response to an operation on the second position, and in a case where capturing of an image of the first capturing range and capturing of an image of the second capturing range are performed together, ending both the capturing of an image of the first capturing range and the capturing of an image of the second capturing range in response to an operation on the first position or the second position.

14. A non-transitory computer readable medium that stores a program, wherein the program causes a computer to execute a method for use in an electronic device including at least one image sensor configured to be able of capturing an image of a first capturing range and an image of a second capturing range different from the first capturing range, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, in a case where capturing of an image of the first capturing range is not performed, starting capturing of an image of the first capturing range in response to an operation on the first position, in a case where capturing of an image of the second capturing range is not performed, starting capturing of an image of the second capturing range in response to an operation on the second position, and in a case where capturing of an image of the first capturing range and capturing of an image of the second capturing range are performed together, ending both the capturing of an image of the first capturing range and the capturing of an image of the second capturing range in response to an operation on the first position or the second position.

15. A method for use in an electronic device including at least one image sensor configured to be able of capturing an image of a first capturing range and an image of a second capturing range different from the first capturing range, a first light source, and a second light source, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, notifying that capturing of an image of the first capturing range is performed, by the first light source, and notifying that capturing of an image of the second capturing range is performed, by the second light source, wherein the first light source is located at a position visible from a side corresponding to the first capturing range, and the second light source is located at a position visible from a side corresponding to the second capturing range.

16. A non-transitory computer readable medium that stores a program, wherein the program causes a computer to execute a method for use in an electronic device including at least one image sensor configured to be able of capturing an image of a first capturing range and an image of a second capturing range different from the first capturing range, a first light source, and a second light source, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, notifying that capturing of an image of the first capturing range is performed, by the first light source, and notifying that capturing of an image of the second capturing range is performed, by the second light source, wherein the first light source is located at a position visible from a side corresponding to the first capturing range, and the second light source is located at a position visible from a side corresponding to the second capturing range.

17. A method for use in an electronic device including at least one image sensor configured to be able of capturing an image of a first capturing range and an image of a second capturing range different from the first capturing range, a first light source, and a second light source, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, notifying that capturing of an image of the first capturing range is performed, by the first light source, and notifying that capturing of an image of the second capturing range is performed, by the second light source, wherein the first light source is located at a position visible from a side opposite to the first capturing range, and the second light source is located at a position visible from a side opposite to the second capturing range.

18. A non-transitory computer readable medium that stores a program, wherein the program causes a computer to execute a method for use in an electronic device including at least one image sensor configured to be able of capturing an image of a first capturing range and an image of a second capturing range different from the first capturing range, a first light source, and a second light source, comprising the steps of:

in response to an operation on a first position on a side, which is oriented in a first direction, of the electronic device, capturing an image of the first capturing range by the at least one image sensor, in response to an operation on a second position on a side, which is oriented in a second direction different from the first direction, of the electronic device, capturing an image of the second capturing range by the at least one image sensor, notifying that capturing of an image of the first capturing range is performed, by the first light source, and notifying that capturing of an image of the second capturing range is performed, by the second light source, wherein the first light source is located at a position visible from a side opposite to the first capturing range, and the second light source is located at a position visible from a side opposite to the second capturing range.

* * * * *